(12) United States Patent
Kanhere et al.

(10) Patent No.: US 8,379,926 B2
(45) Date of Patent: Feb. 19, 2013

(54) VISION BASED REAL TIME TRAFFIC MONITORING

(75) Inventors: Neeraj Krantiveer Kanhere, Clemson, SC (US); Stanley T. Birchfield, Clemson, SC (US); Wayne A. Sarasua, Clemson, SC (US)

(73) Assignee: Clemson University, Clemson, SC (US)

( * ) Notice: Subject to any disclaimer, the term of this patent is extended or adjusted under 35 U.S.C. 154(b) by 259 days.

(21) Appl. No.: 12/747,260

(22) PCT Filed: Dec. 5, 2008

(86) PCT No.: PCT/US2008/085623
§ 371 (c)(1),
(2), (4) Date: Sep. 3, 2010

(87) PCT Pub. No.: WO2009/076182
PCT Pub. Date: Jun. 18, 2009

(65) Prior Publication Data
US 2010/0322476 A1    Dec. 23, 2010

Related U.S. Application Data

(60) Provisional application No. 61/013,416, filed on Dec. 13, 2007.

(51) Int. Cl.
*G06K 9/00* (2006.01)
*G08G 1/095* (2006.01)
*G08G 1/097* (2006.01)
*G06F 19/00* (2011.01)

(52) U.S. Cl. ......... 382/104; 340/907; 340/931; 701/117

(58) Field of Classification Search ............... 382/103, 382/104; 340/906, 907, 910, 917, 919, 931, 340/995.13; 342/454, 456; 701/117, 118, 701/120, 414, 423
See application file for complete search history.

(56) References Cited

U.S. PATENT DOCUMENTS

| | | | |
|---|---|---|---|
| 8,026,842 B2 * | 9/2011 | Fox et al. | 342/52 |
| 8,164,628 B2 * | 4/2012 | Stein et al. | 348/148 |
| 8,249,301 B2 * | 8/2012 | Brown et al. | 382/104 |
| 2004/0100563 A1 * | 5/2004 | Sablak et al. | 348/211.4 |
| 2006/0067562 A1 * | 3/2006 | Kamath et al. | 382/103 |
| 2007/0086675 A1 | 4/2007 | Chinen et al. | |
| 2007/0208498 A1 | 9/2007 | Barker et al. | |
| 2008/0049150 A1 * | 2/2008 | Herbin et al. | 348/744 |

OTHER PUBLICATIONS

International Search Report and Written Opinion for PCTUS 08/85623, dated Feb. 12, 2009.

(Continued)

*Primary Examiner* — Abolfazl Tabatabai
(74) *Attorney, Agent, or Firm* — Dority & Manning, P.A.

(57) ABSTRACT

A system and method for detecting and tracking one or more vehicles using a system for obtaining two-dimensional visual data depicting traffic flow on a road is disclosed. In one exemplary embodiment, the system and method identifies groups of features for determining traffic data. The features are classified as stable features or unstable features based on whether each feature is on the frontal face of a vehicle close to the road plane. In another exemplary embodiment, the system and method identifies vehicle base fronts as a basis for determining traffic data. In yet another exemplary embodiment, the system and method includes an automatic calibration procedure based on identifying two vanishing points.

20 Claims, 12 Drawing Sheets

OTHER PUBLICATIONS

Beymer et al., "A real time computer vision system for measuring traffic parameters," in *Proceedings of the IEEE Conference on Computer Vision and Pattern Recognition*, 1997, pp. 495-501).

Dailey et al., "An algorithm to estimate mean traffic using uncalibrated cameras," in *Proceedings of the IEEE Conference on Intelligent Transportation Systems*, pp. 98-107, 2000).

Kamijo et al., "Traffic monitoring and accident detection at intersections," *IEEE Transactions on Intelligent Transportation Systems*, vol. 1, No. 2, pp. 108-118, Jun. 2000).

Kanhere et al, Real-Time Detection and Tracking of Vehicle Base Fronts for Measuring Traffic Counts and Speeds on Highways, in *Transportation Research Board Annual Meeting*, Washington, D.C., Jan. 2007, TRB paper No. 07-3308.

Kanhere et al, "Automatic Camera Calibration Using Pattern Detection for Vision-Based Speed Sensing," *Transportation Research Board Annual Meeting*, Washington, D.C., Jan. 2008., pp. 39-57.

Kanhere, et al., "Vehicle Segmentation and Tracking in the Presence of Occlusions" TRB Paper No. 06-2943; Nov. 14, 2005.

Kanhere et al., "Vehicle Segmentation and Tracking from a Low-Angle Off-Axis Camera," *IEEE Conference on Computer Vision and Pattern Recognition* (*CVPR*) San, Diego, SA, Jun. 2005.

Saunier et al., "A feature-based tracking algorithm for vehicles in intersections," in *Proceedings of the 3rd Canadian Conference on Computer and Robot Vision*, 2006).

Schoepflin and Dailey, "Dynamic calibration of Pan-Tilt-Zoom Cameras for Traffic Monitoring," in *IEEE Transactions on Intelligent Transportation Systems*, vol. 4(2), pp. 90-98, Jun. 2003).

Song et al., "Dynamic calibration of roadside traffic management cameras for vehicle speed estimation," in *IEEE Transactions on Systems, Man, and Cybernetics*, vol. 36(5), Oct. 2006).

\* cited by examiner

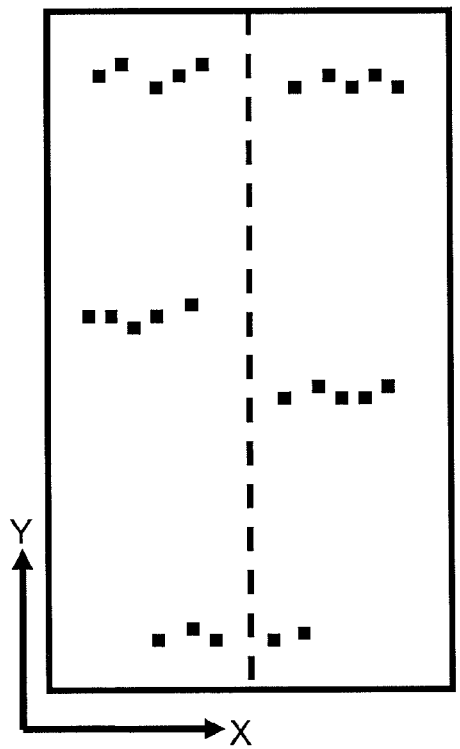
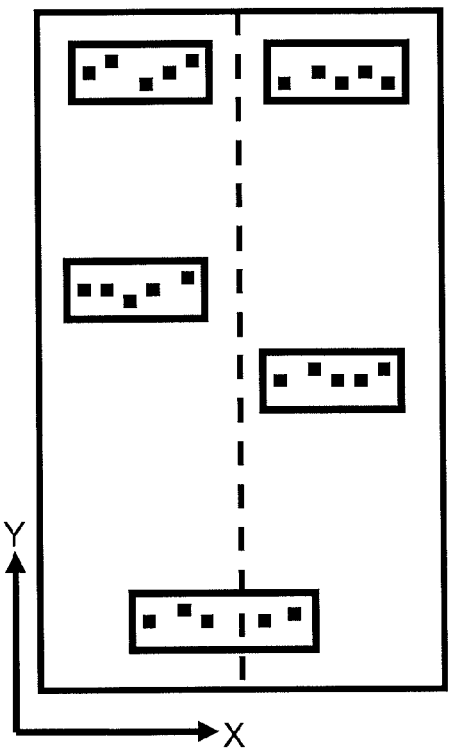
Figure 7a                Figure 7b
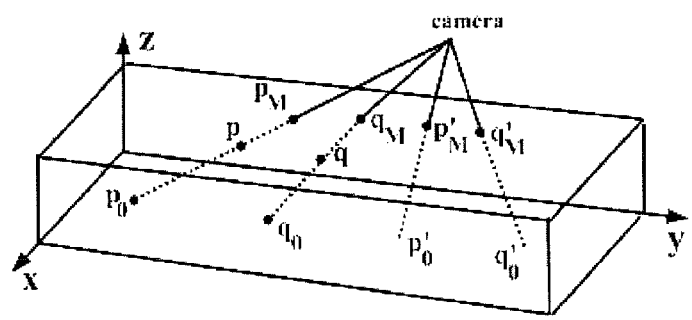
Figure 8

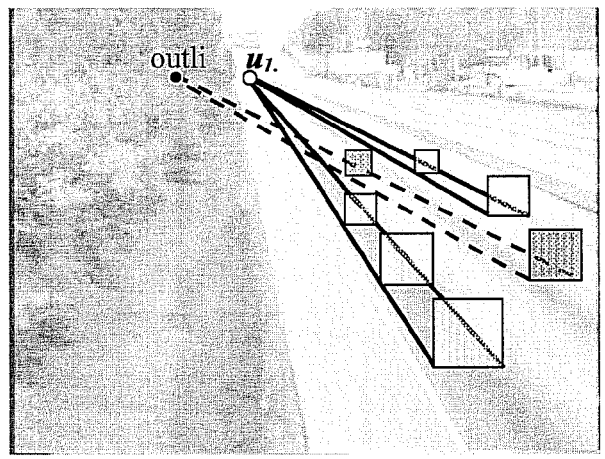
Figure 14a
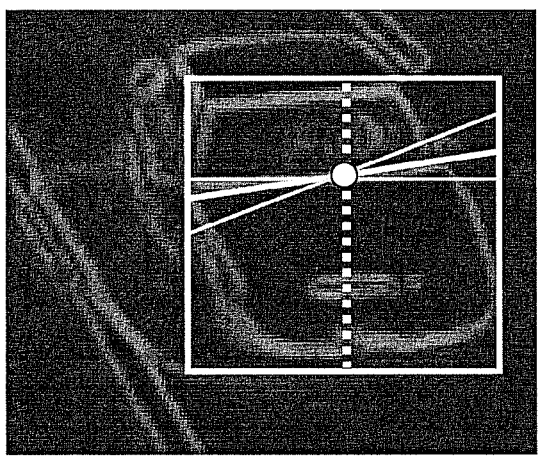 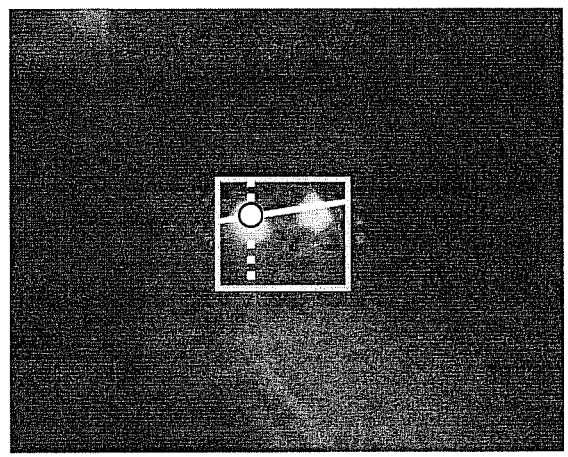
Figure 14b                Figure 14c

VISION BASED REAL TIME TRAFFIC MONITORING

PRIORITY CLAIM

This application claims the benefit of priority of previously filed provisional application with the same title, having U.S. Provisional Patent Application Ser. No. 61/013,416, filed Dec. 13, 2007, which is incorporated herein by references for all purposes.

FIELD

The present disclosure relates to a method and system for vision based real time traffic monitoring.

BACKGROUND

Traffic counts, speeds and vehicle classification are fundamental parameters for a variety of transportation projects ranging from transportation planning to modern intelligent transportation systems. Most intelligent transportation systems are designed using readily available technology (e.g. sensors and communication), such as an inductive loop detector. Other sensing technologies include radar, infrared, lasers, ultrasonic sensors and magnetometers.

Among the many technologies, vision-based systems are emerging as an attractive alternative due to their ease of installation, inexpensive maintenance, and ability to capture a rich description of the scene. In principle, video provides not only aggregate information such as average speed, vehicle counts, and queue lengths, but also individual parameters such as trajectories, individual speeds, and classification.

Existing vision systems typically place cameras high above the ground, anywhere from 15 m to 100 m, to provide a bird's eye view of the road. At such a high vantage point, the appearance of a vehicle does not change significantly over time, and thus occlusion between vehicles is considerably reduced, thus simplifying the problem. However, placing cameras at such heights is not always possible. In non-urban areas the required infrastructure is cost prohibitive, and for transient traffic studies, the expensive mounting equipment and strategic placement of cameras are precluded by a lack of long-term commitment.

The accuracy of vision systems is compromised if the cameras are mounted too low or have poor perspective views of traffic. When the camera is high above the ground and near the center of the road, a homography can be defined to map the road surface to the image plane, and the height of vehicles can be safely ignored because their appearance does not change significantly over time. In contrast, when the camera is at a low angle and/or off centered from the road, the vehicle height causes significant occlusion. A single homography (under the flat world assumption) may not suffice because feature points on a vehicle may spill over into neighboring lanes.

Various approaches to vision based tracking systems have been proposed. These approaches include, for example, blob tracking, active contour tracking, 3D model based tracking, color and pattern-based tracking and tracking using point features (feature tracking). A feature tracking approach is described in Beymer et al. (D. Beymer, P. McLauchlan, B. Coifman, and J. Malik, "A real time computer vision system for measuring traffic parameters," in *Proceedings of the IEEE Conference on Computer Vision and Pattern Recognition*, 1997, pp. 495-501). Beymer et al. describes a system that tracks features throughout the video sequence, then groups the features according to motion cues in order to segment the vehicles. Because the camera is high above the ground, a single homography is sufficient to map the image coordinates of the features to the road plane, where the distances between pairs of features and their velocities are compared. For proper grouping, the features need to be tracked over the entire detection zone which is often not possible when the camera is not looking top-down due to the significant scale changes and occlusions. In another approach, Saunier et al. (N. Saunier and T. Syed, "A feature-based tracking algorithm for vehicles in intersections," in *Proceedings of the 3rd Canadian Conference on Computer and Robot Vision,* 2006) use feature points to track vehicles through short-term occlusions, such as poles or trees. The above approaches have difficulty initializing and tracking partially occluded vehicles. Moreover, these approaches apply to cameras that are mounted relatively high above the ground. At such heights, the problems of occlusion and vehicle overlap are mitigated, thus making feature tracking easier.

A method for segmenting and tracking vehicles in low angle frontal sequences has been proposed by Kamijo et al. (S. Kamijo, Y. Matsushita, K. Ikeuchi and M. Sakauchi, "Traffic monitoring and accident detection at intersections," *IEEE Transactions on Intelligent Transportation Systems*, vol. 1, no. 2, pp. 108-118, June 2000). Under this approach, the image is divided into pixel blocks and a spatiotemporal Markov random field is used to update an object map using the current and previous image. One drawback of this approach is that it does not yield 3D information about vehicle trajectories in the world coordinate system. In addition, in order to achieve accurate results the images in the sequence are processed in reverse order to ensure that vehicles recede from the camera. The accuracy decreases by a factor of two when the sequence is not processed in reverse, thus making the approach unsuitable for on-line processing when time-critical results are required.

In two previous publications, Kanhere I (N. K. Kanhere, S. J. Pundlik, and S. T. Birchfield, "Vehicle segmentation and tracking from a low-angle off-axis camera," in *Proceedings of the IEE Conference on Computer Vision and Pattern Recognition (CVPR)*, June 2005, pp. 1152-1157) and Kanhere II (N. K. Kanhere, S. T. Birchfield, and W. A. Sarasua, "Vehicle segmentation and tracking in the presence of occlusions," in *TRB Annual Meeting Compendium of Papers, Transportation Research Board Annual Meeting*, January 2006), the applicants presented a method for visually monitoring traffic when the camera is relatively low to the ground and on the side of the road where occlusion and perspective effects due to heights of vehicles cannot be ignored. Under this previous approach, stable features were detected and tracked throughout an image sequence and then grouped together using a multilevel homography, which is an extension of the standard homography to the low-angle situation. Using a concept known as the relative height constraint, the 3D height in the world coordinate system of feature points on vehicles were estimated from a single camera. The method discussed in these two publications required a computationally intensive batch processing of image frames and could not process images in real time. Moreover, the processes discussed in these previous publications were incapable of performing vehicle classifications (e.g. car, truck, etc.).

Thus a need exists for a system and method for vision based tracking of vehicles using cameras mounted at low heights that overcomes the limitations of the above methods and systems and that can process images incrementally in real time without being affected by spillover, occlusion, and shadows. The system and method should be able to work in dense traffic and other lighting and weather conditions.

Another problem in vision based tracking systems involves the calibration of cameras used to obtain visual data. Camera calibration is an essential step in vision based vehicle tracking to measure speeds and to improve the accuracy of tracking techniques for obtaining vehicle counts. Due to the dependence in some systems of camera height and position, calibration procedures must be performed in order to detect vehicles whenever a camera is set up or moved. This may preclude full use of movable cameras, such as "pan-tilt-zoom" cameras (PTZ cameras), since each time the camera view is varied, the system must be re-calibrated.

Automatic calibration would not only reduce the tediousness of installing fixed cameras, but it would also enable the use of PTZ cameras without recalibrating whenever the camera moves. Dailey et al. (D. Dailey, F. W. Cathy, and S. Pumrin, "An algorithm to estimate mean traffic using uncalibrated cameras," in *Proceedings of the IEEE Conference on Intelligent Transportation Systems*, pages 98-107, 2000) relates pixel displacement to real-world units by fitting a linear function to scaling factors obtained using a known distribution of the typical length of vehicles. Sequential image frames are subtracted, and vehicles are tracked by matching the centroids of the resulting blobs. At low camera heights, the resulting spillover and occlusion cause the blobs to be merged. Schoepflin and Dailey (Todd N. Schoepflin and Daniel J. Dailey, "Dynamic calibration of Pan-Tilt-Zoom Cameras for Traffic Monitoring," in *IEEE Transactions on Intelligent Transportation Systems*, Vol. 4(2), pages 90-98, June 2003) dynamically calibrate PTZ cameras using lane activity maps which are computed by frame-differencing. Under this approach, spillover is a serious problem for moderate to large pan angles, and this error only increases with low camera heights. Estimating lanes using activity maps is impossible with pan angles as small as 10° when the camera is placed 20 feet above the ground due to the large amount of spillover and occlusion that occurs.

In an alternate approach, Song et al. (Kai-Tai Song and Jen-Chao Tai, "Dynamic calibration of roadside traffic management cameras for vehicle speed estimation," in *IEEE Transactions on Systems, Man, and Cybernetics*, Vol. 36(5), October 2006) uses edge detection to find the lane markings in a static background image, from which the vanishing point is estimated by assuming that the camera height and lane width are known in advance. This method requires the lane markings to be visible, which may not be true under poor lighting or weather conditions. In addition, estimating the static background is not always possible when traffic is dense as it requires time to acquire a good background image. Moreover, background subtraction does not work well with low camera heights due to occlusion and spillover, as noted above.

Thus a further need exists for a system and method for automatically calibrating a camera mounted at a low angle to the road that overcomes the limitations of the above methods and that does not require pavement markings or prior knowledge of the camera height or lane width, is unaffected by spillover, occlusion, and shadows, and works in dense traffic and other lighting and weather conditions.

SUMMARY

Objects and advantages of the invention will be set forth in the following description, or may be apparent from the description, or may be learned through practice of the invention.

One exemplary embodiment of the present invention provides a method and system for detecting and tracking one or more vehicles using a system for obtaining two-dimensional visual data depicting traffic flow on a road. The two-dimensional visual data includes a plurality of image frames. The method and system includes filtering the two-dimensional visual data using background subtraction to yield a foreground mask; identifying a plurality of feature points from the foreground mask using a feature tracker; determining the plumb line projection of the feature points; estimating three-dimensional world coordinates of the feature points using the plumb line projection of the feature points; categorizing each of the feature points as either a stable feature or an unstable feature based on the estimated three-dimensional coordinates of the feature points; grouping stable features into associated groups of stable features; grouping unstable features with groups of associated stable features to create segmented feature groups; and outputting data based on the segmented feature groups.

In variations of this exemplary embodiment, the method and system may include classifying a segmented feature group as either a car or a truck based on the number of unstable features associated with the stable feature group. The method and system may also include tracking segmented feature groups over the plurality of image frames. In another variation of this exemplary embodiment, the method and system includes associating segmented feature groups already being tracked with segmented feature groups in a current image frame by computing the number of stable features shared between the segmented feature groups already being tracked and the segmented feature groups in the current image frame. In yet another variation of this exemplary embodiment, the method and system may include calibrating the system for obtaining two-dimensional visual data. This calibration procedure may be an automatic calibration procedure. In yet another variation of this exemplary embodiment, the method and system may include a camera that is mounted at a low angle and off-centered with respect to the ground.

Another exemplary embodiment of the present invention provides a method and system for detecting and tracking vehicles using a system for obtaining two-dimensional visual data depicting traffic flow on a road. The two-dimensional visual data includes a plurality of image frames. The method and system includes filtering the two-dimensional visual data using background subtraction to yield a foreground mask; detecting a vehicle base front from the foreground mask; tracking the vehicle base front through the plurality of image frames and outputting data based on the tracking of the vehicle base front.

In variations of this exemplary embodiment, the method and system includes calibrating the system for obtaining two-dimensional visual data. This calibration procedure may be an automatic calibration procedure. The method and system may also include features in a base-constrained region associated with the vehicle base front and estimating the displacement of a vehicle base front using the detected features in the base-constrained region associated with the vehicle base front. In another variation of this exemplary embodiment, the method and system may include filtering shadows from the two-dimensional visual data. In yet another variation of this exemplary embodiment, the method and system may include a camera that is mounted at a low angle and off-centered with respect to the ground.

A further exemplary embodiment of the present invention provides a method and system for automatically calibrating a system for obtaining two-dimensional visual data depicting traffic flow. The two-dimensional visual data includes a plurality of image frames and defines a direction of travel and a direction perpendicular to the direction of travel. The method and system includes detecting and tracking a vehicle based on the two-dimensional visual data to determine vehicle tracks of the vehicle; estimating a first vanishing point in the direction of travel using the vehicle tracks of the detected vehicle; estimating a second vanishing point in the direction perpendicular to the direction of travel using strong image gradients found on the detected vehicle; and calibrating the system for detecting and tracking one or more vehicles based on two-dimensional visual data using the first and second vanishing points.

In variations of this exemplary embodiment, the vehicle may be detected using a boosted cascade vehicle detector. The boosted cascade vehicle detector may perform a pattern classification procedure. In another variation of this exemplary embodiment, the method and system may include using a Random Sample Consensus (RANSAC) procedure to eliminate outliers resulting from noise and/or image compression. In yet another variation of this exemplary embodiment, the method and system may include using a hinge point to estimate the second vanishing point. In yet a further variation of this exemplary embodiment, the method and system may include a pan-tilt-zoom camera, the method and system determining the focal length, tilt angle, pan angle, and height of the pan-tilt-zoom camera using the first and second vanishing points.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 7*a* and 7*b* depict how stable features are grouped in a road plane;

FIG. 8 depicts an exemplary three-dimensional world coordinate system model used in grouping unstable features;

FIG. 14*a* depicts the estimation of a vanishing point in the direction of travel using vehicle tracks;

FIG. 14*b* depicts the use of gradient magnitudes to determine a hinge point (shown as a white circle) followed by slope estimation during daylight conditions;

FIG. 14*c* depicts how raw pixel intensities are used to estimate a second vanishing point from the headlights of vehicles;

DETAILED DESCRIPTION OF THE DRAWINGS

Figure 1:
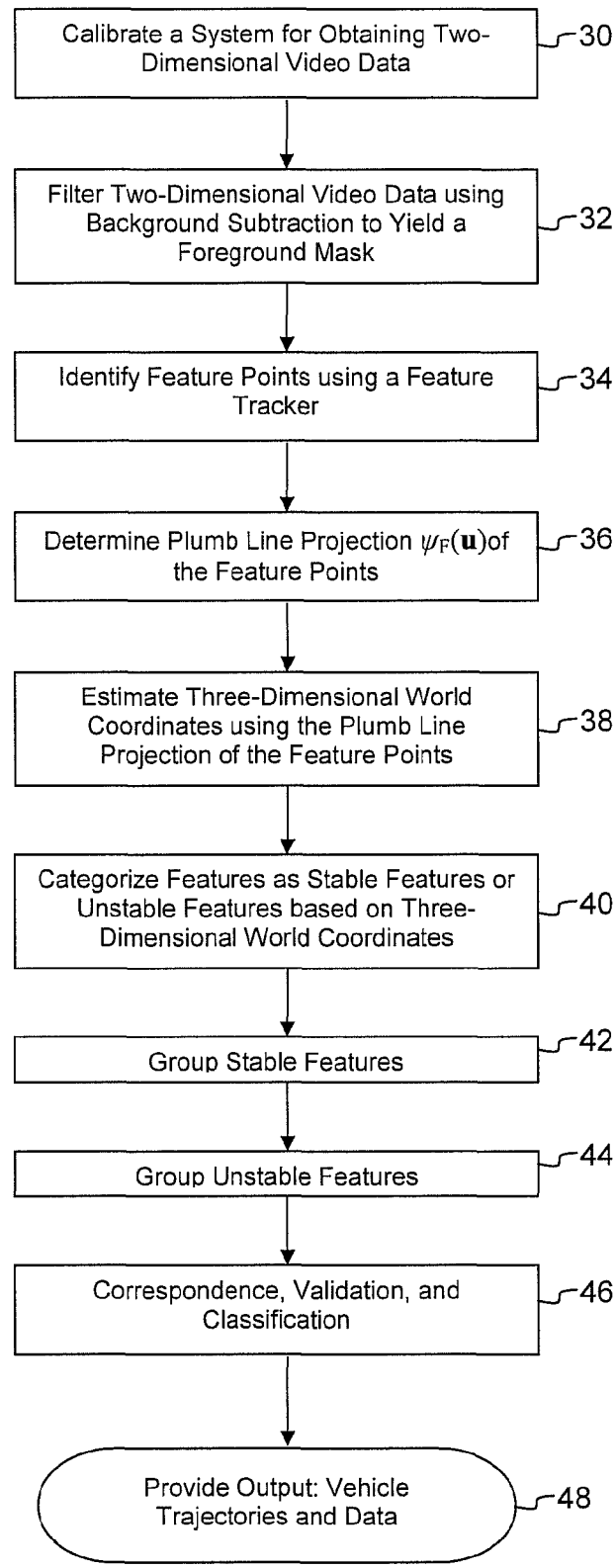
FIG. 1 is a flow diagram of the exemplary steps associated with an exemplary embodiment of the present invention.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the other computer uses to access the actual data from a still further computer.

The various computer systems discussed herein are not limited to any particular hardware architecture or configuration. Embodiments of the methods and systems set forth herein may be implemented by one or more general-purpose or customized computing devices adapted in any suitable manner to provide desired functionality. The device(s) may be adapted to provide additional functionality complementary or unrelated to the present subject matter, as well. For instance, one or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to application-specific circuits. Of course, combinations of computer-executed software and hard-wired logic or other circuitry may be suitable, as well.

Embodiments of the methods disclosed herein may be executed by one or more suitable computing devices. For instance, a vehicle tracking system may comprise one or more computer systems that can provide functionality as discussed herein. Such system(s) may comprise one or more computing devices adapted to perform one or more embodiments of the methods disclosed herein. As noted above, such devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

Any suitable computer-readable medium or media may be used to implement or practice the presently-disclosed subject matter, including, but not limited to, diskettes, drives, and other magnetic-based storage media, optical storage media, including disks (including CD-ROMs, DVD-ROMs, and variants thereof), flash, RAM, ROM, and other memory devices, and the like.

The present disclosure also makes reference to the relay of communicated data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

As was noted above, the present subject matter can be implemented using any number, type, or variety of computer systems. For example, in some embodiments, a vehicle tracking system is implemented as part of a centralized traffic control center. The control center can comprise one or more computers which receive data from one or more traffic cameras at and/or remote from the control center. In some embodiments, the data comprises visual data sent to the control center for observation by operators and/or processing using one or more vehicle tracking algorithms as taught herein.

In some embodiments, a camera or other visual sensor can be implemented as part of a system which also analyzes or partially analyzes traffic data on-site. For instance, a camera housing may include suitable processing apparatus, memory, and the like, to analyze traffic data as visual data is collected and provide tracking information to another device, such as a computer at a traffic control center.

In some embodiments, one or more cameras are provided as part of a mobile traffic analysis unit. For instance, a van or other vehicle may comprise a tripod-mounted camera, one or more computers, and suitable power source. The computer(s) may analyze visual data from the camera (or cameras) while the van or other vehicle is temporarily positioned at a location of interest. Similarly, a camera may be used in conjunction with a portable computer by a technician who wishes to analyze traffic at a particular location.

Exemplary embodiments of vehicle tracking methods and systems will be presented below. Each method and system is presented along with an exemplary calibration procedure. It will be understood that, in some embodiments, the methods may be used with different calibration procedures. For example, the automatic calibration procedure presented in conjunction with a discussion of tracking based on pattern recognition could be used in conjunction with a vehicle tracking method based on tracking vehicle features.

Still further, in some embodiments, aspects of any vehicle tracking methods presented herein may be combined with aspects of other vehicle tracking methods, whether presented herein or elsewhere.

As an example, one embodiment of a vehicle tracking system could use pattern-based identification of vehicles in order to establish calibration parameters for subsequent tracking. Vehicles could be identified and tracked based on both identifying one or more visual features through pattern matching and through one of the other feature tracking methodologies discussed herein, such as gradient-based search techniques.

Referring now to FIG. 1, the exemplary steps of a vision based real time traffic monitoring system and method that utilizes feature tracking is disclosed. The system and method of this exemplary embodiment identifies groups of features as a basis for determining traffic data. Specifically, features are classified as "stable" or "unstable" based on determining whether each feature is on the frontal face of a vehicle close to the road plane. Of course, in some embodiments, features on other parts of the vehicles are identified. Features are identified using gradient-based search techniques, although the features could additionally or alternatively be identified any other suitable way (including but not limited to, by pattern recognition as set forth herein). Further, although a partially-automated calibration procedure is described, using the teachings disclosed herein, it will be understood that other calibration process(es) could be used.

The system and method of this exemplary disclosure uses a camera that is relatively low to the ground. At such low angles, 3D perspective effects cause significant appearance changes over time, as well as severe occlusions by vehicles in neighboring lanes. By utilizing a 3D perspective mapping from the scene to the image, along with a plumb line projection, the system and method of the present embodiment is able to distinguish a subset of features whose coordinates can be accurately estimated. These features are then grouped to yield the number and location of the vehicles, and standard feature tracking is used to maintain the location of the vehicles over time. Additional features are assigned to these groups and are used to classify vehicles as cars or trucks. The system and method of this embodiment incrementally processes image frames obtained from a camera beside the road and operates in real time.

FIG. 1 provides a flow chart of the exemplary steps of the system and method for vision based real time traffic monitoring according to an exemplary embodiment of the present invention. The system and method of this exemplary embodiment includes detecting and tracking feature points through the video sequence and removing features lying on the background or on shadows by background subtraction. The features are separated into two categories: stable and unstable. Using a plumb line projection, the 3D coordinates of the stable features are computed and are grouped together to provide a segmentation of vehicles. The unstable features are assigned to these groups. The system and method may further include eliminating groups that do not appear to be vehicles, establishing correspondence between groups detected in different image frames to achieve long-term tracking, and classifying vehicles based on the number of unstable features assigned to a group. The details of each of these steps are described below.

As shown in FIG. 1, the system and method of this exemplary embodiment includes a calibration step 30. Although a partially-automated calibration procedure is described, using the teachings disclosed herein, it will be understood that other calibration process(es) could be used.

For purposes of this exemplary disclosure, assume a world coordinate system with the y-axis pointing along the direction of travel along the road, the z-axis being perpendicular to the road plane with the positive axis pointed upward and z=0 on the road surface. The x-axis is chosen to form a right hand coordinate system. According to a pinhole camera model, a world point $p=[x\ y\ z]^T$ projects onto a point $u=[u\ v]^T$ on an image plane through the equation:

$$\dot{u} = C\dot{p} \quad (1)$$

where C is a 3×4 camera calibration matrix, and $\dot{u}=[uw\ vw\ w]^T$ and $\dot{p}=[x\ y\ z\ 1]^T$ are homogenous, coordinates of the image and world points, respectively. Since w is an arbitrary nonzero scale factor, C has 11 unique parameters. Thus, the correspondence of at least six points in a non-degenerate configuration leads to an overdetermined system that can be solved for these parameters.

In an exemplary embodiment, to calibrate the system the user manually draws two lines along the edges of the road and one line perpendicular to the direction of travel. The latter line is estimated by sequencing through the video and finding the intensity edge between the windshield and hood of a light-colored vehicle. The three lines yield two vanishing points, from which the internal and external camera parameters are computed automatically using the mathematical formula described by Schoepflin and Dailey, which is hereby incorporated by reference. The remaining six vertices of the cuboid defining the 3D detection zone are then computed from the user specified lane width, number of lanes, and desired height and length of the cuboid.

Figure 2A:
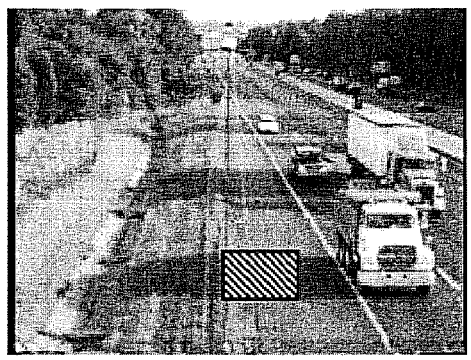
FIG. 2*a* depicts an exemplary input frame before undergoing background subtraction.
Figure 2B:
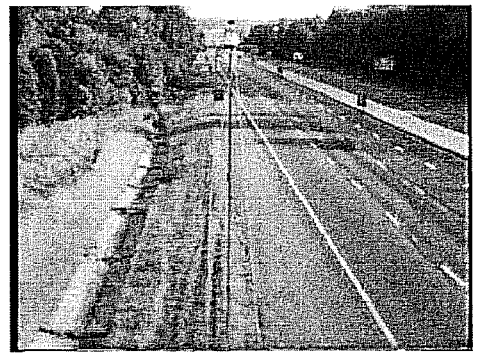
FIG. 2*b* depicts a computed background image for the input frame shown in FIG. 2*a*.
Figure 2C:
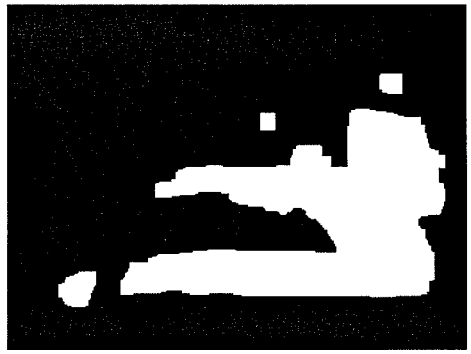
FIG. 2*c* depicts a foreground mask without undergoing shadow detection or suppression.
Figure 2D:
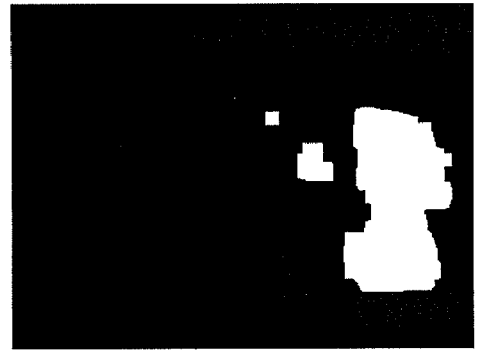
FIG. 2*d* depicts a foreground mask with shadow detection and removal or shadow suppression.

Block 32 of FIG. 1 provides the filtering of the two-dimensional video data using background subtraction to yield a foreground mask. FIG. 2a provides an exemplary input frame before undergoing background subtraction. FIGS. 2c and 2d depict a scene that has undergone background subtraction to yield a foreground mask. In an exemplary embodiment, the background of the scene is learned by storing the average gray level of each pixel over a fixed period of time, for example 20 seconds. An example learned background is shown in FIG. 2b. A higher traffic density would require more time to adequately remove the effects of the dynamic foreground objects. Once the background is learned off-line, the process of background subtraction, including morphological operations and thresholding, is applied to each image of the sequence to yield a binary foreground mask that indicates whether each pixel is foreground or background. To cope with lighting and environmental changes, the background is adaptively updated as the sequence is processed to preclude inadvertently adapting to foreground intensities. Using this filtering technique, any feature that lies in the background region is immediately discarded from further processing, leaving only the features that lie on foreground objects.

One of the serious problems in using background subtraction is the distraction caused by moving shadows, which mistakenly appear as foreground pixels. It is not uncommon for shadows to cause multiple nearby vehicles to merge into a single blob or for the shadows to be detected as separate vehicles themselves (see for example FIG. 2c). Several techniques have been proposed to address the problem of shadow detection. In an exemplary embodiment, the system and method ignores any features that lie within a small distance $\tau_s$, such as $\tau_s=2$ pixels, from a background pixel. This simple procedure removes many of the features due to shadow edges alone, since the road surface tends to be fairly untextured, while removing only a small fraction of legitimate foreground features. An example of an image frame that has undergone background subtraction with shadow suppression is shown in FIG. 2d.

Block 34 of FIG. 1 represents the selecting and tracking feature points. In an exemplary embodiment, feature points are automatically selected and tracked using the Lucas-Kanade feature tracker as described in Shi et al. (J. Shi and C. Tomasi, "Good features to track," in *Proceedings of the IEEE Conference on Computer Vision and Pattern Recognition*, 1994, pp. 593-600) which is hereby incorporated by reference. An example of such a feature tracker is the OpenCV implementation of the feature tracker which used the Sharr gradient operator as discussed in Bouget (J-Y Bouget, "Pyramidal implementation of the Lucas Kanade feature tracker," OpenCV documentation, Intel Corporation, Microprocessor Research Labs, 1999), which is incorporated herein by reference. A coarse to fine pyramidal strategy allows for large image motions, and features are automatically selected, tracked, and replaced.

Blocks 36 and 38 of the exemplary method and system disclosed in FIG. 1 include determining the plumb line projection of the feature points and estimating the 3D coordinates from the 2D image using the plumb line projection. Because of the dimension loss in projecting the 3D world to a 2D image, it is impossible to uniquely determine the coordinates of the corresponding world point from the image coordinates of a feature point. However, if one of the world coordinates is known from some additional source of information, then the other two coordinates can be computed.

Figure 3A:
FIG. 3*a* depicts an exemplary input frame with feature point u.
Figure 3B:
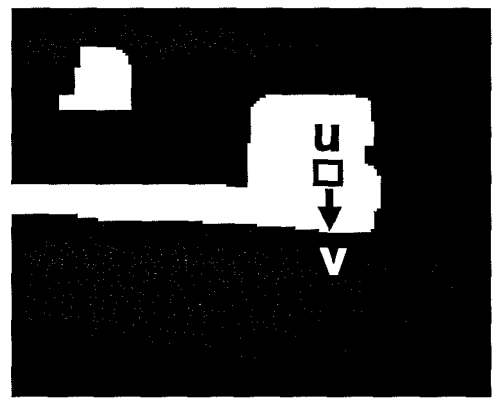
FIG. 3*b* depicts the foreground mask of the exemplary frame shown in FIG. 3*a* with feature point u and its plumb line projection v.
Figure 3C:
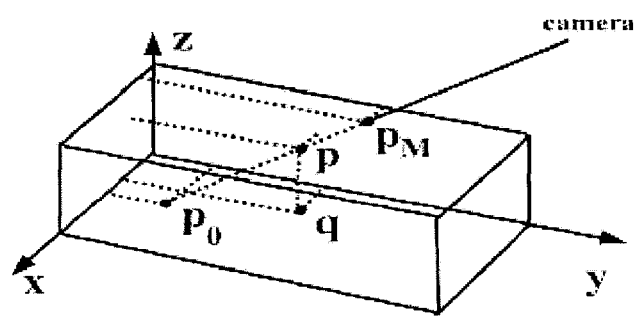
FIG. 3*c* shows that under certain assumptions discussed in detail below, p and q (three-dimensional world coordinates of u and v) have the same x and y coordinates and q lies on the road surface, thus providing the constraints needed to compute the world coordinates of p.

For example, suppose a feature point u and a binary foreground mask F from background subtraction as shown in FIGS. 3a and 3b are known. Projecting u downward in the image plane to the first encountered background pixel yields a point v that is referred to as the plumb line projection (PLP) of u. Let $v=\psi_F(u)$ denote the plumb line projection of u. Let $p=\Phi(u)$ denote the preimage (world point) of u (the world point whose projection onto the image is u). Let $q=\Phi(v)$ be the preimage (world point) of v. As shown in FIG. 3c, under certain assumptions discussed in detail below, p and q have the same x and y coordinates and q lies on the road surface, thus providing the constraints needed to compute the world coordinates of p.

Let $\phi_z: R^2 \rightarrow R^3$ be the mapping from a 2D image point to its corresponding world point at height z. In other words, an image point u could arise from any world point along the projection ray passing through u and the camera focal point, and $p=\phi_z(u)$ is the one whose third coordinate is z. Expanding and rearranging equation (1) above yields the inhomogeneous equation:

$$\varphi_z(u) = K^{-1}(u)t_z(u) \qquad (2)$$

where $$K(u) = \begin{bmatrix} c_{31}u - c_{11} & c_{32}u - c_{12} & 0 \\ c_{31}v - c_{21} & c_{32}v - c_{22} & 0 \\ 0 & 0 & 1 \end{bmatrix}$$

$$t_z(u) = \begin{bmatrix} c_{14} - u + z(c_{13} - c_{33}u) \\ c_{24} - v + z(c_{23} - c_{33}v) \\ z \end{bmatrix}$$

$u=[u\ v]^T$ is the projection of p, and $c_{ij}$ is the ijth element of C.

Since the world coordinate system is oriented so that z=0 is the road plane, the world coordinates of q as $\phi_0(v)$, which also yields the x and y coordinates of p. To compute the 3D world coordinates of p, one must only compute its z coordinate, which is done by solving equation (1) above in a least squares manner to yield:

$$\tilde{z} = \frac{h_p^T h_c}{H_p^T h_p} \qquad (3)$$

where, $$h_p = \begin{bmatrix} uc_{33} - c_{13} \\ vc_{33} - c_{23} \end{bmatrix}$$

$$h_c = \begin{bmatrix} c_{14} - uc_{34} + (c_{11} - uc_{31})x + (c_{12} - uc_{32})y \\ c_{24} - vc_{34} + (c_{21} - vc_{31})x + (c_{22} - vc_{32})y \end{bmatrix}$$

and x and y are the first two coordinates of p and q. $\tilde{z}$ denotes the estimated height of p.

The system and method of this exemplary disclosure categorizes feature points as a stable feature or an unstable feature based on the estimated 3D coordinates of the feature points as shown in Block 40 of FIG. 1. The technique just presented for computing the 3D coordinates of the preimage of a feature point u from its plumb line projection relies upon three assumptions: (1) the world points $p=\Phi(u)$ and $q=\Phi(v)$ lie on the same vertical axis; (2) the z coordinate of q is zero; and (3) the foreground mask F perfectly labels the pixels directly under u (in the FIG. 3b). In other words, the method and system of this exemplary disclosure assumes that the vehicle is shaped like a box, that the features lie on one of the four surfaces of the box orthogonal to the road plane, and that there are no occluding vehicles or shadows in the vicinity. The validity of these assumptions will now be examined in detail.

Figure 4:
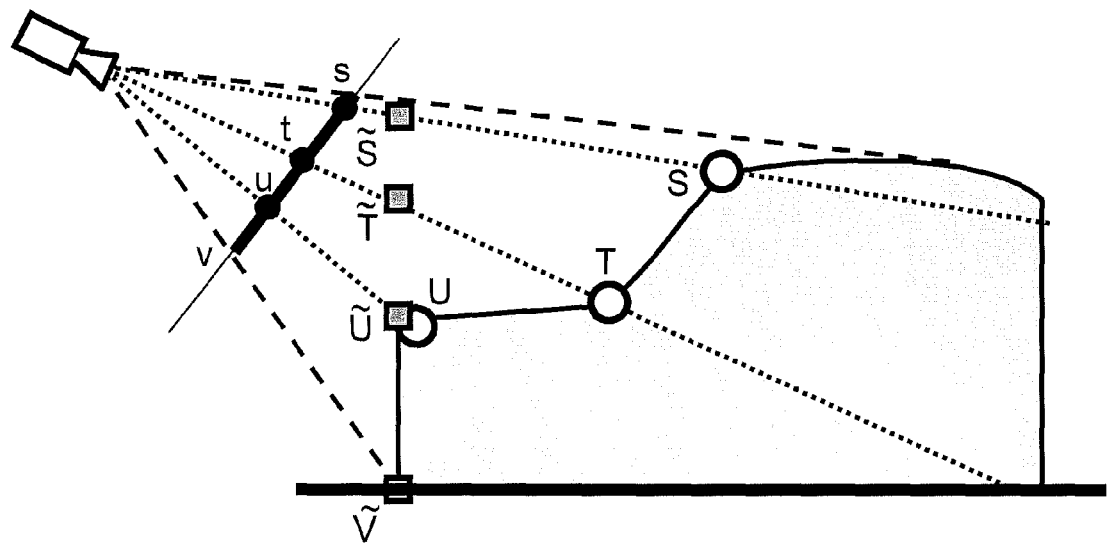
FIG. 4 depicts three exemplary feature points on the surface of a vehicle viewed by a camera with their estimated three-dimensional world coordinates using plumb line projection.

FIG. 4 shows the side view of a vehicle with three feature points s, t, and u having preimages (world points) S, T, and U, respectively on the surface of the vehicle. With the third assumption satisfied $v=\psi_F(s)=\psi_F(t)=\psi_F(u)$, i.e. all three points share the same plumb line projection and the estimated point $\tilde{V}=\phi_0(v)$ is the actual point v. Using the coordinates of $\tilde{V}$, the plumb line projection technique described above can be used to estimate the world coordinates of $\tilde{S}$, $\tilde{T}$, and $\tilde{U}$. As shown in FIG. 4, it is evident that the error in prediction of world coordinates is generally greater for points that are higher above the road plane. More precisely, let $\Omega$ be defined as the set of vehicle shapes such that the slope of the contour at any point never exceeds the bound $\mu_{max}(x, y)$. This gives rise to two observations. Given that the set $\Omega$ encompasses nearly all actual vehicle shapes, the following observations are widely applicable. Only vehicles with severe concavity fall outside the set $\Omega$.

Observation 1. For any two points $S=(x_S, y_S, z_S)$ and $U=(x_U, y_U, z_U)$ on the surface of the vehicle such that $z_S > z_U$, the Euclidean error in the estimate $\tilde{S}$ will not be less than that of $\tilde{U}$. In other words, $\|\tilde{S}-S\| \geq \|\tilde{U}-U\|$ as long as the vehicle shape is in $\Omega$. Thus, the Euclidean error in estimating the world coordinates of a point on the vehicle is a monotonically non-decreasing function of the height of the point.

Observation 2. Another important observation regards the effect of the height of the estimates on the maximum possible error. For any two estimated points $\tilde{S}=(\tilde{x}_S, \tilde{y}_S, \tilde{z}_S)$ and $\tilde{U}=(\tilde{x}_U, \tilde{y}_U, \tilde{z}_U)$ such that $\tilde{z}_S > \tilde{z}_U$, the maximum possible Euclidean error in the estimate $\tilde{S}$ is greater than that of $\tilde{U}$. In other words, $\max\|\tilde{S}-S\| > \max\|\tilde{U}-U\|$. The validity of this observation is shown in FIG. 4, which illustrates that the estimated height of $\tilde{z}$ will always be greater than or equal to its actual height (as long as the point does not extend past the front of the vehicle).

Figure 5:
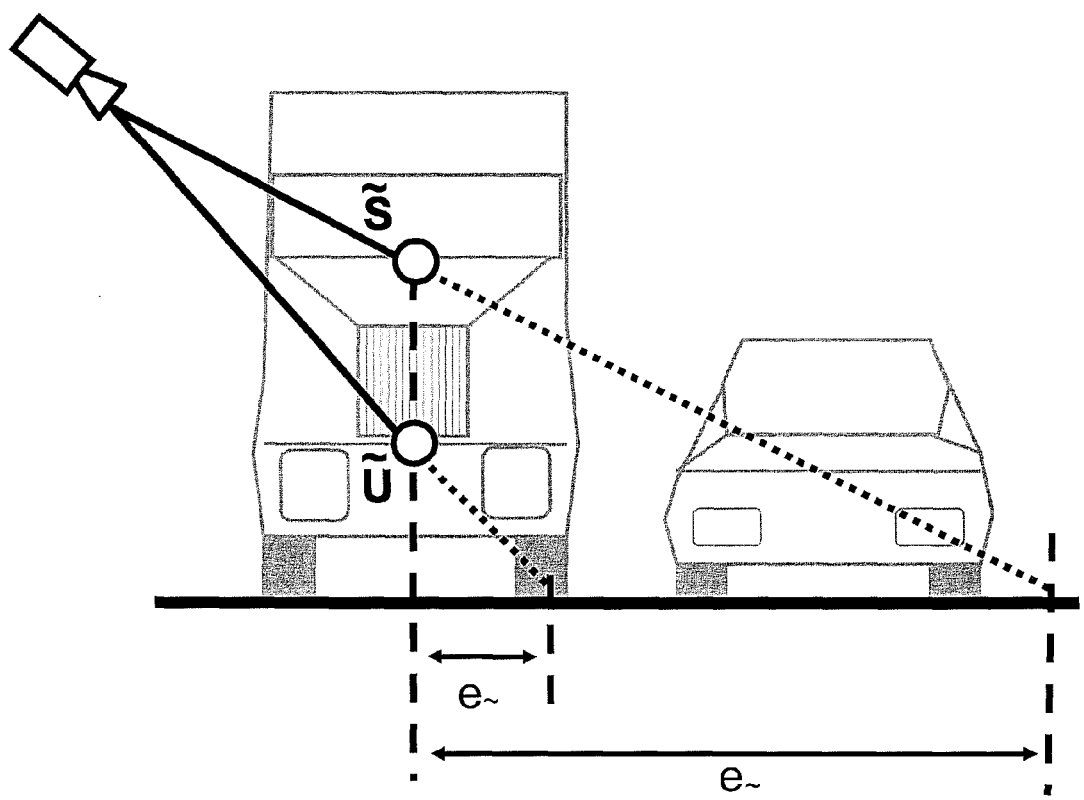
FIG. 5 depicts the estimated three-dimensional world coordinates of two exemplary feature points using plumb line projection.

Referring to FIG. 5, two vehicles traveling side-by-side are shown where the camera in 3D is aimed toward the front of the vehicles at an oblique angle. Let $\tilde{S}$ and $\tilde{U}$ be the 3D estimates of two preimages using the plumb line projection technique, with $\tilde{S}$ higher above the road than $\tilde{U}$. Using the upper bound $z_{true} \leq \tilde{z}$, the range of possible locations for the actual preimage (world point) is much less for the point lower to the ground. In the example shown in FIG. 5, even the maximum error would not cause the estimate point $\tilde{U}$ to leave the vehicle, whereas with $\tilde{S}$ the point could be assigned to the wrong vehicle. Accordingly, both observations lead to the conclusion that points close to the road plane exhibit less error.

Figure 6:
FIG. 6 depicts two exemplary feature points on an exemplary image and the plumb line projections of their perturbations.
Figure 6:
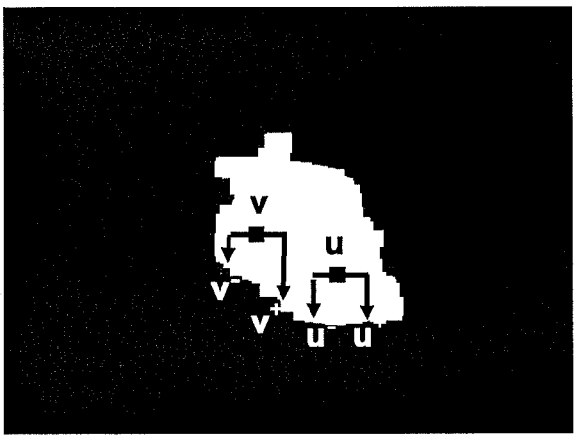
Figure 6:
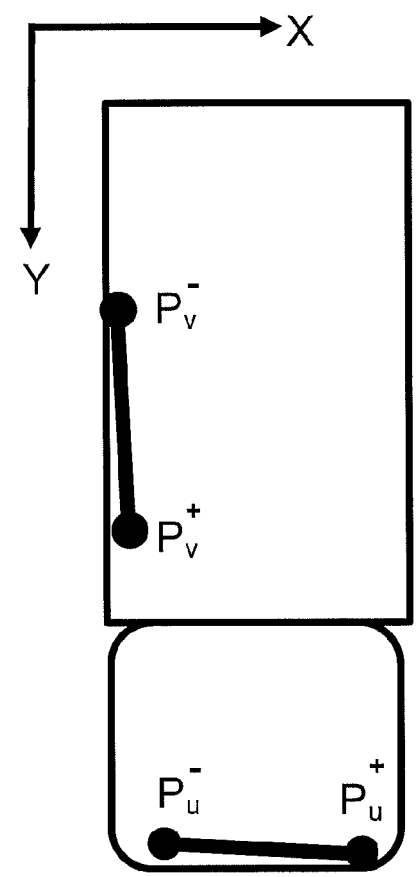

In addition to the height of the vehicle, it is also important to consider the side of the vehicle on which the feature lies. For each feature $u=[u\ v]^T$, the plumb line projection of two points is obtained by perturbing the feature horizontally in the image plane as shown in FIG. 6: $u^+=\psi_F([u+\delta\ v])^T$ and $u^-=\psi_F([u-\delta\ v])^T$. The 3D coordinates of the preimages are given by $p_u^+=[x^+, y^+, z^+]=\phi_0(u^+)$ and $p_u^-=[x^-, y^-, z^-]=\phi_0(u^-)$. If the absolute value of the slope in the road plane $\xi=|(y^+-y^-)/(x^+-x^-)|$ is small, then the point is more likely to be on the front of the vehicle rather than the side. Since the shadows on the side tend to be more severe than those on the front, the points on the front are less likely to violate the third assumption and hence are more reliable.

Using the above analysis, two kinds of features are distinguished: stable features and unstable features. A feature is classified as stable if $\tilde{z} < \epsilon_z$ and $< $ and $\xi < \epsilon_{slope}$ where $\epsilon_z$ and $\epsilon_{slope}$ are positive, constant parameters of the system and method. In an exemplary embodiment, $\epsilon_y=\epsilon_z=0.4\ w_{lane}$, $\epsilon_{slope}=1.5$, and $\delta=3$ pixels, where $w_{lane}$ is the width of a lane computed during the calibration step 30.

In other words, features are stable if they lie on the frontal face of the vehicle close to the road plane. Note that these criteria only require a single image frame, are robust with respect to shadows on the side of the vehicle, and are not affected by errors in feature tracking, unlike the criteria used in Kanhere I.

Block 42 of this exemplary embodiment depicted in FIG. 1 include the grouping of stable features. Once the stable features have been identified, the stable features are grouped in the road plane as shown in FIGS. 7a and 7b. Because of the criteria used in selecting stable features, points belonging to the same vehicle generally have a small deviation in their world coordinates along the y-axis (axis along the length of the road). As a result, a simple region growing procedure is sufficient to correctly segment the stable features.

The system iterates through the points, adding each point to an existing group in the same lane if its predicted y-coordinate is within $\epsilon_y$ of the mean y-coordinates of all the features in the group. If no such group is found, then a new group is created. To handle vehicles that straddle two lanes (such as vehicles that are changing lanes), two groups whose means in y differ by no more than $\epsilon_y$ are combined into a single group if their combined width (along the x-axis) is no more than the lane width $w_{lane}$.

The system and method for selecting and grouping stable features is much more computationally efficient and less sensitive to tracking errors than the technique used in Kanhere I. Moreover, this system and method operates on a single image frame which facilitates incremental processing of the video. Only a stable feature per vehicle is needed in order for the vehicle to be correctly detected. However, in an exemplary embodiment, groups with fewer than three features are discarded to reduce the number of false detections.

Block 44 of the exemplary embodiment shown in FIG. 1 includes the grouping of unstable features. After grouping the stable features, the unstable features are assigned to these groups using a combination of plumb line projection and motion coherence (as represented in Block 46 of FIG. 1). Suppose two features that are tracked from locations u and s in one image frame to u' and s' in another (not necessarily consecutive) image frame. Let $p_z = \phi_z(u)$ and $q_z = \phi_z(s)$ denote their preimages (world coordinates) in the first frame at height z, and let $p_z' = \phi_z(u')$ and $q_z' = \phi_z(s')$ denote their possible preimages (world coordinates) in the other frame. If s is a stable feature, then the coordinates of the preimages $q = \Phi(s)$ and $q' = \Phi(s')$, which can then be used to estimate the preimages of $p = \Phi(u)$ and $p' = \Phi(u')$ in the following manner.

The scenario is shown in FIG. 8, with z=0 referring to the road plane and z=M referring to the top of the calibration box. Assuming p and q are points on the same rigid vehicle that is only translating, then the motion vectors of the two points are the same: $p'-p=q'-q$. This is the motion coherence assumption. Each point can be represented parametrically as follows:

$$p = p_0 + \alpha(p_M - p_0)$$

$$p' = p_0' + \alpha'(p_M' - p_0') \quad (4)$$

where $\alpha, \alpha' \in R$ are the fractional distances along the ray. Assuming that the road is horizontally flat, then the z component of p and p' are equal, from which it can easily be shown that $\alpha = \alpha'$. Substituting these parametric equations into $p'-p=q'-q$ and solving for $\alpha$ in a least squares manner yields $$\alpha = \frac{(\Delta p_M - \Delta p_0)^T (\Delta q - \Delta p_0)}{(\Delta p_M - \Delta p_0)^T (\Delta p_M - \Delta p_0)} \quad (5)$$

where $\Delta pM = p'_M - p_M$, $\Delta p_0 = p'_0 - p_0$, and $\Delta q = q' - q$. As a result, the estimated point is given by $$\hat{p} = p_0 + \frac{(\Delta p_M - \Delta p_0)^T (\Delta q - \Delta p_0)}{(\Delta p_M - \Delta p_0)^T (\Delta p_M - \Delta p_0)} (p_M - p_0) \quad (6)$$

and similarly for p'. All of the quantities on the right hand side are known, since $p_0 = \phi_0(u)$ and $p_M = \phi_M(u)$.

Let $q^i = [x_q^i\ y_q^i\ z_q^i]^T$ be the coordinates of the centroid of the stable features in group i. For each unstable feature p, the above process is used to estimate the world coordinates of its preimage with respect to group i by assuming motion coherence with $q^i$ to yield $\hat{p}^i = [\hat{x}_p^i\ \hat{y}_p^i\ \hat{z}_p^i]^T$. In addition, the world coordinates are estimated using plumb line projection as described above to yield $\tilde{p} = [\tilde{x}_p\ \tilde{y}_p\ \tilde{z}_p]^T$. Using these estimates and assuming conditional independence along the different dimensions and score indicating whether p belongs to group I is computed according to the following method:

$$L_p^i = L_x^i L_y^i L_z^i L_l^i L_h^i \quad (7)$$

where $$L_x^i = \exp[-(x_q^i - \hat{x}_p^i)^2 / \sigma_x^2]$$

$$L_y^i = \begin{cases} \exp[-(y_q^i - \hat{y}_p^i)^2 / \sigma_x^2] & \text{if } \hat{y}_p^i > y_q^i \\ \exp[-(\hat{y}_p^i - y_q^i + \lambda_l)^2 / \sigma_y^2] & \text{if } \hat{y}_p^i < (y_q^i - \lambda_l) \\ 1 & \text{otherwise} \end{cases}$$

$$L_z^i = \begin{cases} \exp[-(\hat{z}_p^i)^2 / \sigma_z^2] & \text{if } \hat{z}_p^i < 0 \\ \exp[-(\tilde{z}_p - \hat{z}_p^i)^2 / \sigma_z^2] & \text{if } \hat{z}_p^i > \tilde{z}_p \\ 1 & \text{otherwise} \end{cases}$$

$$L_l^i = \exp[-(1 - l^i)^2 / \sigma_l^2]$$

$$L_h^i = \exp[-1 - h^i)^2 / \sigma_h^2]$$

The first three factors $(L_x^i, L_y^i, L_z^i)$ compute a modified Mahalanobis distance from the estimated coordinates to the centroid of the vehicle. $L_x^i$ favors features which lie close the centroid along the x-axis. $L_y^i$ assumes the vehicle occupies a portion of the road between $y = y_q^i$ and $y = y_q^i - \lambda_l$, where $\lambda_l$ is the minimum truck length and the positive y axis points in the direction of traffic flow. Points outside this region are compared with the nearest edge. In the vertical direction, the vehicle is assumed to occupy the space between $z=0$ and $z=\tilde{z}_p$, based on the upper bound of $z_{true}$ mentioned above.

The last two factors $(L_l^i, L_h^i)$ increase the score of larger vehicles, ignoring the actual point p. Three points are considered: the centroid $q^i = [x_q^i\ y_q^i - \lambda_l\ z_q^i]^T$ of the stable features of the group, and two points shifted from the centroid along the y and z axis, $q_l^i = [x_q^i\ y_q^i - \lambda_l\ z_q^i]^T$ and $q_h^i = [x_q^i\ y_q^i\ z_q^i + \lambda_h]^T$. The values of $\lambda_l$ and $\lambda_h$ are the minimum length and height for a vehicle to be considered a truck. Let the projections of these points onto the image be denoted by $u^i$, and $u_l^i$, and $u_h^i$, respectively. Let the fraction of pixels along a straight line between $u^i$ and $u_l^i$ that are foreground pixels (in the foreground mask) be $l^i$, and let the same fraction along the line between $u^i$ and $u_h^i$ be $h^i$, so that $0 \leq l^i$ and $h^i \leq 1$. In other words, $l^i$ and $h^i$ indicate the fractional length and height of the vehicle compared with the minimum truck length and height, respectively. As a result, the factors $L_l^i$ and $L_h^i$ encourage features that are high off the ground (i.e. unstable features) to be grouped with larger vehicles (i.e. those with large values of $l^i$ and $h^i$).

Let a and b be the groups that yield the highest and second highest values, respectively, for the score of this feature. Then the feature is assigned to group a if $L^a > L_{min}$ and $L^a / L^b > L_{ratio}$. These conditions assign an unstable feature to a stable group if the feature is likely to belong to that group (controlled by $L_{min}$) and at the same time unlikely to belong to other groups (controlled by $L_{ratio}$). In an exemplary embodiment, $\sigma_x=\sigma_y=\sigma_z=5$ feet, $\sigma_i=\sigma_h=0.1$ pixels, $\lambda_i=1.2\ w_{lane}$, $\lambda_h=0.8\ w_{lane}$, $L_{min}=0.8$, $L_{ratio}=2$.

Block 46 of the exemplary embodiment depicted in FIG. 1 includes correspondence, validation, and classification. The correspondence between the feature groups segmented in the current frame and the vehicles (i.e., feature groups) already being tracked is established by computing the number of stable features shared between the groups. Each vehicle is matched with the segmented feature groups in the current frame and is associated with the group having the maximum number of stable features in common. If a vehicle has no features in common with any of the groups, then its status is updated as "missing," and its location in subsequent frames is updated using its current velocity. For each vehicle, the total number of frames that it was tracked successfully ($\eta_t$) and the number of recent consecutive frames that it has been missing ($\eta_m$) are counted.

After finding a match for all non-missing vehicles, the remaining unassociated feature groups in the current frame are matched with the missing vehicles based on the closest Euclidean distance between the centroids of the groups in world coordinates. Each missing vehicle is associated, one at a time, with the closest feature group if that group is within a distance of $\tau_x$ and $\tau_y$ in the x and y axes, respectively. Then the remaining unassociated feature groups in the current frame are initialized as new vehicles.

When a vehicle exits the detection zone, it is discarded if it has not been tracked for a sufficient number of frames, i.e., $\eta_t < \tau_\eta$. This can be viewed as a simplified temporal filtering to remove spurious and fragmented vehicle detections. In addition, a vehicle is discarded if $\eta_m > \kappa\ \eta_t$ where $\kappa \geq 0$, at any time, which is important to prevent momentary false detections from being retained.

To classify a vehicle as a car or truck, the number of unstable features associated with that vehicle over all the frames that the vehicle is tracked is summed. As used herein, the term car refers to a vehicle with two axles. The term truck refers to a vehicle more than two axles. Vehicles with more than $n_{truck}$ unstable features are classified as trucks, while the rest are considered cars. Unstable features are used because they are rarely associated with cars due to their low height, whereas the number of stable features for cars and trucks tends to be about the same. The number of unstable features associated with trucks is usually much greater than that of cars (typically five to ten times higher). In an exemplary embodiment, $\tau_x=0.3\ w_{lane}$, $\tau_y=0.5\ w_{lane}$, $\tau_\eta=4$, $\kappa=2$, and $n_{truck}=20$.

The final step 48 of this exemplary disclosure includes outputting vehicle trajectories and data such as aggregate information including average speed, vehicle counts, and queue lengths and individual parameters such as trajectories, individual speeds, and classification.

Example

The system and method of this exemplary embodiment was tested on eleven grayscale video sequences captured by a 30-Hz camera placed on an approximately nine meter pole on the side of the road and digitized at 320×240 resolution. No additional preprocessing was performed to suppress shadows or to stabilize the occasional camera jitter. For each sequence, an initial calibration step was used to provide an approximate mapping between 2D image coordinates and 3D world coordinates, as described above. After the calibration, the system was fully automatic, outputting the lane counts, vehicle trajectories, and vehicle classification (car/truck) in real time.

The test sequences differed by the camera placement, field of view, direction of traffic flow, variations in lighting conditions (including long shadows), curved roads, scale and angle changes, and number of lanes. The "long" sequences were 10 minutes each (18,000 image frames), while the "short" sequences were approximately 30 seconds each (900 image frames). Sequences S1 and S4 were extracted from the same video from which L1 and L4, respectively, were extracted, with no overlap in image frames between the short and long versions. As mentioned earlier, the same parameter values were used in processing all the sequences.

A quantitative assessment of the performance of the system and method of this exemplary embodiment on these sequences is presented in Table 1. The segmentation and tracking performance exceeded 90% on all the sequences and the classification accuracy was more than 95%. The false positive rate exhibited variation, ranging from 1% to 7% of the total vehicles in all the sequences except S9, where long shadows caused the rate to reach 12%. The lower detection rate in the L3 sequence is due to the number of features successfully detected and tracked because of the relatively low texture on the rear of the vehicles.

TABLE 1

| Seq. | Vehicles (Trucks) | Segmented & Tracked | FP | Classified |
| --- | --- | --- | --- | --- |
| L1 | 627 (50) | 610 (97%) | 3 | 99.2% (4/1) |
| L2 | 492 (56) | 481 (98%) | 18 | 97.3% (2/11) |
| L3 | 325 (38) | 298 (92%) | 6 | 97.2% (5/4) |
| L4 | 478 (57) | 456 (95%) | 8 | 98.5% (3/4) |
| L5 | 217 (14) | 209 (96%) | 7 | 98.1% (1/3) |
| L6 | 102 (20) | 97 (95%) | 1 | 98.0% (2/0) |
| L7 | 157 (29) | 146 (93%) | 6 | 96.8% (3/2) |
| S1 | 104 (7) | 98 (94%) | 5 | 97.1% (2/1) |
| S4 | 43 (3) | 39 (91%) | 3 | 97.6% (1/0) |
| S8 | 113 (8) | 107 (95%) | 4 | 98.2% (1/1) |
| S9 | 51 (5) | 47 (92%) | 6 | 94.1% (1/2) |

The system and method of this exemplary embodiment was not without error. For example, the system and method failed to track certain vehicles that remained occluded throughout the detection zone. The system and method also misinterpreted two motorcycles traveling side-by-side as a single car. Such error could be avoided by incorporating a model for motorcycles into the system and method.

The system and method of this example was implemented in C++ language using the Blepo computer library at Clemson University and the OpenCV Lucas-Kanade tracker. On a 2.8 GHz P4 laptop computer with 512 MB of memory, the average processing time for a single image frame was 32 ms, which is slightly faster than frame rate. To achieve this speed, the background was updated every 60 frames (two seconds), new features were detected every five frames, and binary morphological operations (dilation and erosion) were performed on subsampled images (by a factor of two in each direction).

Figure 9:
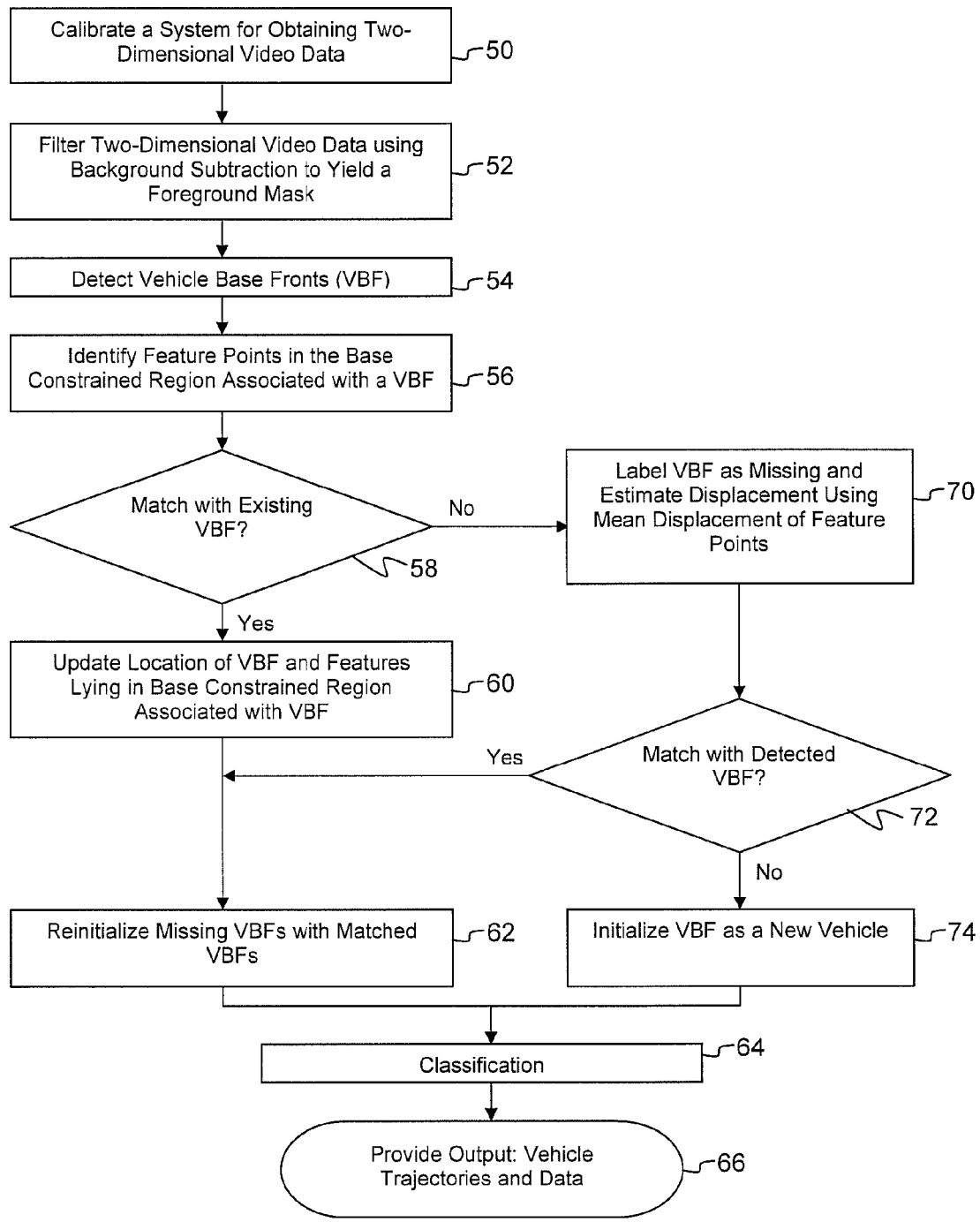
FIG. 9 depicts a flow diagram of the exemplary steps associated with another exemplary embodiment of the present invention.

Referring now to FIG. 9, a flow diagram of the exemplary steps associated with another exemplary embodiment of the present invention is disclosed. In this exemplary embodiment, a vehicle tracking system identifies vehicle base fronts as a basis for determining traffic data, including volume, time-mean speed, space-mean speed, density, vehicle classification, and lane change activities. Although a partially-automatic calibration process may be used in this embodiment, using the teachings disclosed herein, it will be understood by those skilled in the art that other calibration procedures may also be used.

FIG. 9 depicts the exemplary steps associated with a real time system and method for automatically monitoring a highway when the camera is relatively low to the ground and on the side of the road. The system and method of this exemplary embodiment is based on a technique of detecting and tracking base fronts of vehicles. This method and system involves a simplified problem formulation, operates in real time, and requires only a small number of parameters to calibrate. By handling perspective effects and vehicle occlusions, the method and system of this embodiment overcomes some of the limitations of commercially available machine vision based traffic monitoring systems that are used in many intelligent transportation system applications.

A single homography (plane-to-plane mapping) is often insufficient to correctly segment all the foreground pixels in an image because of the depth ambiguity in the scene observed from a single camera. The depth ambiguity arises from the fact that for a point in the world, every point lying on the ray passing through the camera-center and that point are projected as a single point in an image. To address this problem, the system and method of this exemplary embodiment detects regions in the image where the depth ambiguity is absent. Since the base of a vehicle is in direct contact with the road, there is no ambiguity in mapping it from the image coordinates to the world coordinates using a single homography.

This exemplary embodiment utilizes the detection and tracking of the front side of a vehicle's base, referred to as a vehicle base front (VBF). Often two or more vehicles appear as a single blob in the foreground mask as a result of partial occlusions and a non-ideal perspective view of the scene. In such situations, detecting VBFs helps in separating and tracking individual vehicles. In order to improve the accuracy of tracking, feature points associated with a VBF are tracked. When an image frame lacks sufficient evidence to track a VBF by matching, feature points associated with a VBF are used to predict and update its location in consecutive frames.

As shown in FIG. 9, the system and method of this exemplary disclosure includes a calibration step 50. The calibration step 50 is performed to account for scale changes due to perspective effects and to successfully detect VBFs. An exemplary calibration procedure will be described below, however, using the teachings disclosed herein, one of ordinary skill in the art will understand that other calibration procedures may also be performed.

In an exemplary calibration procedure, a user specifies four points on the road, along with the width, length and the number of lanes in the detection zone formed by these points. For counting vehicles, an approximate width-to-length ratio is sufficient, but accurate speed measurement requires an accurate ratio.

The homography is defined by a 3×3 matrix H having eight parameters. Since overall scale is not important, the last element of the matrix is set to a fixed value of 1. Each calibration point leads to two equations, so that four such non-collinear points are needed for an exact solution to the eight unknown elements in H. The mapping between image coordinates and the road-plane coordinates will be denoted as $$P' = H P \text{ and } P = H^{-1} P',$$

where P and P' are homogeneous coordinates in the image plane and road plane, respectively, of a world point.

Block 52 of the exemplary embodiment depicted in FIG. 9 includes performing background subtraction to yield a foreground mask. The process of background subtraction involves initializing and maintaining a background model of the scene. At run time, the estimated background image is subtracted from the input frame, followed by thresholding the difference image and morphological processing to reduce the effects of noise, in order to yield foreground blobs. At run time, only the pixels that are not labeled as foreground pixels are used to update the background, the step size being used to control the rate at which this update occurs. In one exemplary embodiment, adaptive median filtering can be used, although preliminary experimentation indicated that averaging and standard median filtering produce similar results.

Moving shadows are a major problem for successful detection and tracking of vehicles in most tracking procedures. This exemplary disclosure implements a basic shadow-detection module where the difference image D is computed as:

$$D(x, y) = 0 \quad \text{if } NT_L < B(x, y) - I(x, y) < NT_H$$
$$= |I(x, y) - B(x, y)| \quad \text{otherwise}$$

where I is the input frame, B is the background image, and the shadow thresholds ($NT_L$, $NT_H$) are user-defined.

The thresholds may be decided empirically by observing the intensities corresponding to a manually-selected shadow region. FIG. 2a shows this region (the cross-hatched rectangle) and FIG. 2c shows the background image for the sequence. FIGS. 2b and 2d illustrate the result of applying the shadow detection step. The requirement of setting the shadow thresholds manually could be replaced by an implementation in which a region outside the detection zone (similar to the cross-hatched rectangle in FIG. 2a) would be monitored for the presence of shadows, and the thresholds would be chosen automatically from the intensity differences observed over time in that region.

Figure 10A:
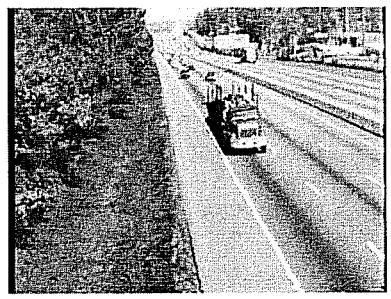
FIG. 10*a* depicts an exemplary input frame.
Figure 10B:
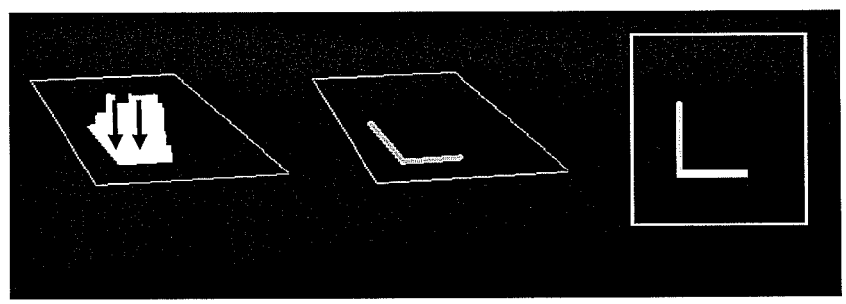
FIG. 10*b* depicts an exemplary foreground mask of the input frame shown in FIG. 10*a* along with associated base pixels projected onto the road plane.

Block 54 of the exemplary embodiment depicted in FIG. 9 includes the detection of vehicle base fronts. For each input frame, an example of which is shown as FIG. 10a, background subtraction is followed by morphological operations (dilation and erosion) to yield foreground blobs, shown in FIG. 10b. Pixels corresponding to the vehicle base front of a vehicle are easily found using a difference operator in the vertical direction:

$$B(x, y) = 1 \quad \text{if } F(x, y) - F(x, y+1) > 0$$
$$= 0 \quad \text{otherwise,}$$

where the foreground pixels are labeled with a positive value, while the background pixels are labeled with the value of zero. The resulting base image B is shown in FIG. 10b. After projecting the base image on the road plane using the homography matrix H, connected component analysis is performed to select only the front side of a base region (i.e., the segment oriented in the horizontal direction).

The reason for selecting only the front of a base is that the sides of a base are more likely to be occluded due to shadows and adjacent vehicles, whereas the fronts of vehicle bases appear disjoint even under partial occlusions. Base fronts are tracked in the projected plane to reduce the sensitivity of tracking parameters to scale changes. It should be noted that, although region- and contour-based approaches can handle occlusions, if the vehicles enter the scene un-occluded, such techniques fail when the camera angle is low because multiple vehicles often enter the scene partially occluded.

Figure 10C:
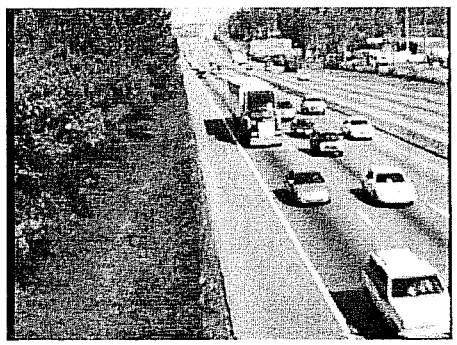
FIGS. 10*c*, 10*d*, and 10*e* depict the ability of vehicle base fronts to separate vehicles which appear as a single blob in a cluttered scene.
Figure 10D:
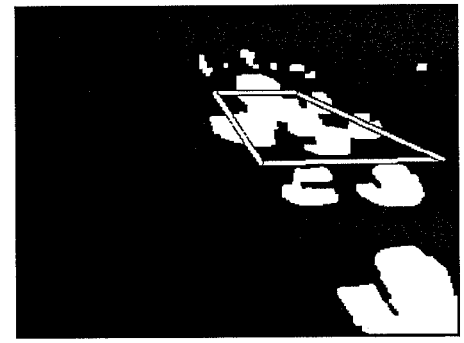
Figure 10E:
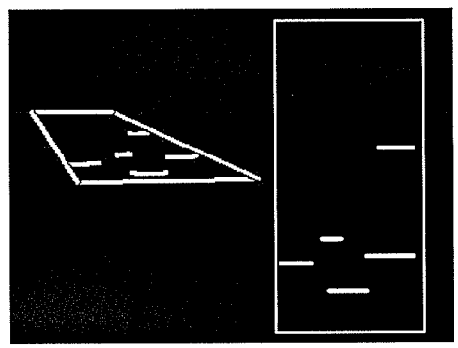

The ability of VBFs to separate vehicles which appear as a single blob in a cluttered scene is illustrated in FIGS. 10c, 10d, and 10e. Instead of segmenting all the foreground pixels (or feature points) in the presence of depth ambiguity, only those pixels for which there is no depth ambiguity (i.e., a vehicle base front) are segmented. For counting vehicles and measuring speeds, tracking VBFs yields accurate results since vehicles are segmented at the beginning of the detection zone even when partially occluded.

Occasionally while tracking a VBF, a corresponding match cannot be found in the next frame, for instance a vehicle being tracked moves very close to a vehicle traveling ahead of it, which causes the VBF of the tracked vehicle to be occluded. In such a scenario, feature points associated with that VBF are used to predict its location. These features are selected from a region in the image referred to as a base-constrained region. Any feature point found in this region is likely to lie on the vehicle associated with that VBF under the assumed box model.

Figure 11A:
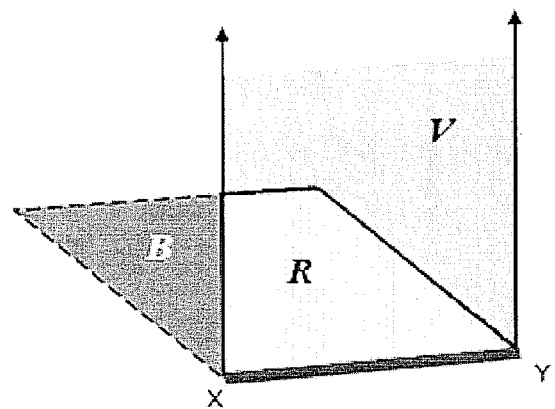
FIG. 11*a* depicts a vehicle base front in an image plane.
Figure 11B:
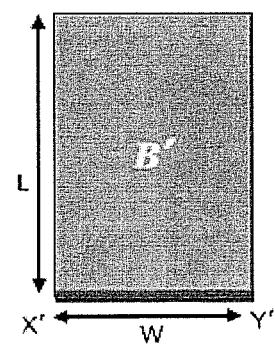
FIG. 11*b* depicts a top view of the base region.

If a vehicle has infinite height, then any point in the image which falls vertically down on its VBF lies on the frontal surface of that vehicle. The idea behind computing the base constrained region is to assume zero height for the vehicles. FIG. 11a shows an image of a vehicle where XY is a vehicle base front. The top-view projection of the VBF (using homography matrix H) is shown in FIG. 11b. Under the assumption that the length L of a vehicle is greater than a constant multiple of its width W (for example, a constant value of 1.5), region B' represents the base of a vehicle. The base-constrained region R is the region of intersection in the image between B (region in the image corresponding to B') and V (a plane orthogonal to the road surface bounded by X and Y).

Figure 11C:
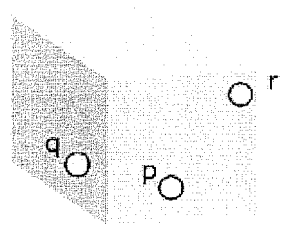
FIG. 11*c* depicts an assumed box model of a vehicle with three arbitrary points q, p, and r.
Figure 11D:
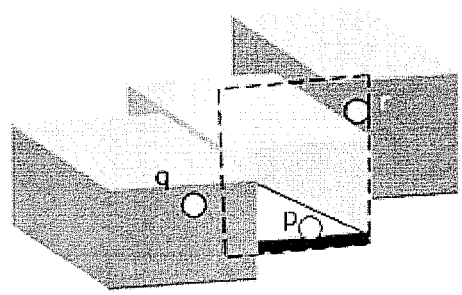
FIG. 11*d* illustrates that points in the base-constrained region lie on the vehicle even with partial occlusion.

Consider a vehicle as shown in FIG. 11c with three points p, q and r. With the assumed dimensions of the vehicle, and with no occlusion, all three points lie on the vehicle. If the height of the vehicle is less than the assumed height as shown in FIG. 11d, the point r will no longer be on the vehicle. Similarly the point q is now on the occluding vehicle whereas the point p which lies in the base-constrained region is still on the same vehicle.

For each VBF, feature points are automatically selected in the corresponding base-constrained region and tracked using the Kanade-Lucas-Tomasi (KLT) feature tracker as discussed in S. Birchfield (S. Birchfield, "KLT: An implementation of the Kanade-Lucas-Tomasi feature tracker," available at http://www.ces.clemson.edu/~stb/klt/) based on the process proposed in Tomasi and Kanade (Carlo Tomasi and Takeo Kanade, "Detection and tracking of point features," Technical Report CMU-CS-91-132, Carnegie Mellon University, April 1991), both of which are incorporated by references. The Kanade-Lucas-Tomasi feature tracker computes the displacement d that minimizes the sum of squared differences between consecutive image frames I and J.

$$\int\int_W \left[I\left(x-\frac{d}{2}\right) - J\left(x+\frac{d}{2}\right)\right]^2 dx$$

where W is a window of pixels around the feature point. The nonlinear error is minimized by repeatedly solving its linearized version:

$$Zd = e$$

where, $$Z = \sum_{X \in W} g(x)g^T(x)$$

$$e = \sum_{X \in W} g(x)[I(x) - J(x)]$$

$$g(x) = \frac{\partial \frac{I(X)+J(X)}{2}}{\partial x}$$

As in Tomasi and Kanade, features are automatically selected as those points in the image for which both eigenvalues of Z are greater than a minimum threshold.

During tracking, if a match is found for a VBF in the next frame, the list of features associated with it is updated. In case the match is not found, the location of the VBF in the next frame is predicted using the mean displacement of the features associated with it as discussed in detail below.

Tracking is achieved by matching detections in the new frame with the existing VBFs. The steps in the tracking process are as follows:

1) The background image is subtracted from the input frame and after suppressing shadows, hysteresis thresholding and morphological operations are performed to compute foreground mask (Block 52 of FIG. 9).
2) Vehicle base fronts are detected in the image as described in the previous section, and the top-view of VBFs is computed using homography matrix H. Filtering is performed to discard VBFs having width less than a $W_{min}$ (which is computed as a multiple of lane-width and kept constant for processing all the sequences) (Block 54 of FIG. 9).
3) Each existing VBF is matched with the detected VBFs in the current frame using nearest neighbor search. The distance between an existing vehicle base front A and a new detection B is computed as $d(A, B) = \min\{E(A_L,B_L), E(A_R,B_R)\}$ where E(A, B) is the Euclidean distance between two points A and B. Subscripts L and R indicate left and right end points of a VBF in the projected top-view. The best match i corresponds to the detection $B_i$ that is closest to the VBF being tracked. The search for the nearest neighbor is limited to a distance $D_N$ proportional to the lane width. (Block 58 of FIG. 9).
4) If a close match is found as described in step 58, the location of the VBF is updated, and features that lie in the corresponding base-constrained region are associated with it. (Block 60 of FIG. 9).
5) If a close match is not found in step 58, the VBF is labeled as missing and its displacement in the next frame is estimated as the mean displacement of the features associated with it. (Block 70 of FIG. 9).
6) Each missing VBF is matched with the detected VBFs (in the current frame) that are not already associated with another VBF. If a match is found, the missing VBF is re-initialized with the matched VBF. (Blocks 72 and 62 of FIG. 9).
7) Each detected VBF that is not associated with another VBF is initialized as a new vehicle detection if its width is greater than a threshold ($W_{new}$), which is computes in terms of lane-width. (Block 74 of FIG. 9).
8) A missing VBF is marked invalid and is not processed further if the number of frames for which it is missing is more than the number of frames for which it was tracked.
9) When a VBF (tracked or missing) exits the detection zone, corresponding measurements such as lane counts and speeds are updated using its trajectory.

Block 64 of the exemplary embodiment disclosed in FIG. 9 includes classification of the vehicle. The type of the vehicle (truck or car) is determined (in the frame in which the vehicle exits the detection zone) by measuring the height (from the center of VBF) and length (from an endpoint of a VBF) of a blob. A vehicle is classified as a truck when both the length and the height of the blob are greater than corresponding thresholds. If a vehicle is traveling on the far side of an occluding vehicle, then the length of the corresponding blob will be more than the length-threshold ($CT_L$), but the height of the blob from the center of VBF will be less than the height-threshold ($CT_H$), and the vehicle will not be misclassified as a truck. On the other hand, if a vehicle is traveling on the near side of another vehicle, then the height of the blob will be more than the height threshold, but the length will be less than a threshold, which will prevent the vehicle from being misclassified as a truck. The threshold values are computed in terms of the lane-width.

Example

The system and method of this exemplary disclosure was implemented in the C++ language to develop a real-time system for counting vehicles (lane counts) on freeways and single- and multi-lane highways, measuring speeds, and classifying detected vehicles (car and truck). The system uses the Blepo Computer Vision Library being developed at Clemson University.

To compare the accuracy of the proposed system, it was tested on four different sequences with varying traffic and weather conditions. The camera was mounted on a 26' tripod approximately 12' from the side of the road and the sequences were digitized at 320×240 resolution and 30 frames per second. No preprocessing was done to stabilize occasional camera jitter or to compensate for lighting conditions. For each sequence, offline camera calibration was performed once, as explained earlier.

Quantitative analysis of the system's performance is shown in Table 2. The detection rate is above 90% in all the sequences. In Sequences 2 and 3, false detections are caused by shadows (although shadow suppression reduced the number of false positives, but did not eliminate the problem completely) and occasional splitting of the foreground mask (when brightness of a vehicle matches closely with that of road). Using KLT features improves the results because in case a direct match is not found for a VBF, mean feature point displacement gives more accurate predication of its location compared to the prediction computed from just the previous displacement.

Table 2 provides a comparison of two variations of this exemplary embodiment against ground truth. The detection accuracy includes all the vehicles in all the lanes with KLT. The right-most column indicates the number of vehicles classified as trucks. (SS is shadow suppression, KLT is with feature point tracking, and FP is the number of false positives.)

TABLE 2

| | Sequence 1 (No SS) Moderate traffic, strong shadows | | | | Sequence 4 (No SS) Slow moving traffic, fog, no shadows | | | |
|---|---|---|---|---|---|---|---|---|
| Long sequences | Lane 1 | Lane 2 | Lane 3 | Trucks | Lane 1 | Lane 2 | Lane 3 | Trucks |
| Ground truth | 336 | 412 | 130 | 70 | 325 | 384 | — | 87 |
| No KLT | 333 | 406 | 128 | 64 | 323 | 369 | — | 80 |
| Detection | 98% | FP | 5 | | Detection | 97% | FP | 14 |

| | Sequence 1 (No SS) Moderate traffic, short shadows | | | | Sequence 2 (No SS) Heavy traffic, medium shadows | | | |
|---|---|---|---|---|---|---|---|---|
| Short test sequences | Lane 1 | Lane 2 | Lane 3 | Trucks | Lane 1 | Lane 2 | Lane 3 | Trucks |
| Ground truth | 41 | 48 | 25 | 7 | 34 | 41 | 52 | 12 |
| No KLT | 41 | 46 | 24 | 6 | 34 | 35 | 44 | 10 |
| KLT | 41 | 46 | 25 | 6 | 33 | 38 | 47 | 10 |
| Detection | 98% | FP | 1 | | Detection | 93% | FP | 8 |

| | Sequence 3 (SS) Moderate traffic, long shadows | | | | Sequence 4 (No SS) Slow traffic, fog, no shadows | | | |
|---|---|---|---|---|---|---|---|---|
| | Lane 1 | Lane 2 | Lane 3 | Trucks | Lane 1 | Lane 2 | Lane 3 | Trucks |
| Ground truth | 35 | 22 | 2 | 7 | 16 | 26 | — | 2 |
| No KLT | 31 | 19 | 2 | 7 | 13 | 22 | — | 2 |
| KLT | 32 | 19 | 2 | 7 | 15 | 24 | — | 2 |
| Detection | 90% | FP | 5 | | Detection | 92% | FP | 3 |

The accuracy of the speed estimates has not been reported due to the lack of the ground truth speed data for every vehicle in all four sequences. However, the mean speeds computed at three minute intervals for two long sequences (about 15 minutes each) were within 8% of the manually observed values. Unlike previous approach, this exemplary embodiment can process the video data in real time, requires a simpler calibration step, and requires fewer parameters.

A sequence (short sequence-1) was analyzed using a known commercial system. The detection markers were placed (by an experienced user of the system) to maximize the vehicle count accuracy. The same sequence was tested using a system according to this exemplary embodiment and it was found that out of the 114 vehicles, the known commercial system detected 108 vehicles with 8 false positives (double counts) whereas the system according this exemplary embodiment detected 112 vehicles with just 1 false detection. The same parameter values were used for all the sequences ($CT_L$=1.0, $CT_L$=0.5, $D_N$=2.0, $W_{min}$=0.5, $W_{new}$=0.7). With the value used for $W_{new}$ the system is unable to detect motorcycles. Using a smaller value for $W_{new}$ it is possible to detect motorcycles but leads to increased false positives. Shadow detection was used for Sequence 2 and 3 to reduce false positives ($NT_L$=30, $NT_H$=50). The average processing speed was found to be 34 frames per second which demonstrates the ability of the system to operate in real time.

Figure 12:
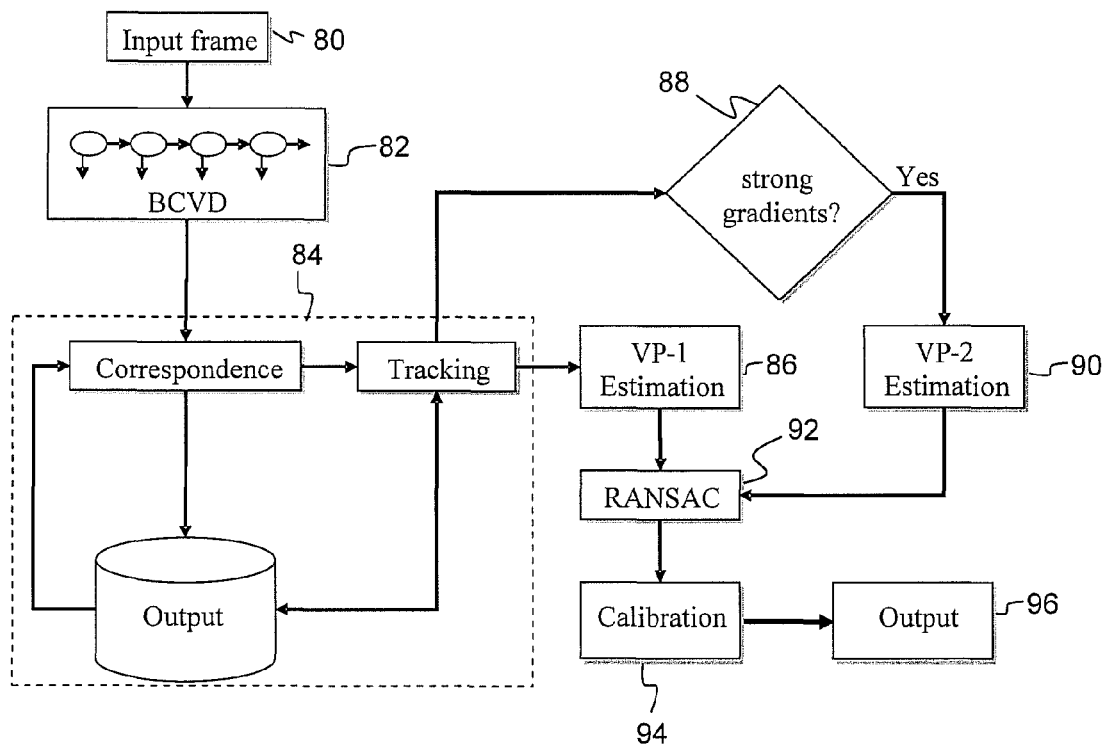
FIG. 12 depicts a flow diagram of the exemplary steps associated with another exemplary embodiment of the present invention.

Referring now to FIG. 12, a vehicle tracking system and method that includes an automatic calibration procedure based on vehicles which are identified using one or more features recognized by pattern matching is disclosed. Specifically, camera height, focal length, and pan and tilt angles are calculated based on identifying two vanishing points, with the vanishing points identified based on vehicle motion over two (or more) frames. The calibration techniques could be used in embodiments in which vehicles are identified in other ways, for example, by any of the feature tracking methods disclosed herein.

In the embodiments discussed below, vehicles are identified by pattern recognition, such as by recognizing features via one or more classifiers scanned over the image in a boosted cascade pattern classification/recognition procedure. Each classifier is an operator resulting from a training process in which a set of training images comprising vehicles and non-vehicles are evaluated, with the classifier comprising the operator which best serves to separate vehicle images from non-vehicle images.

In this exemplary embodiment, a pinhole camera model with the following assumptions is adopted: the road surface is flat, the roll angle of the camera is zero, the aspect ratio of the pixels is unity, and the principal point (the intersection of the optical axis and the image plane) is the image center. With these assumptions, four parameters are needed to map between pixel distances (measured in the image) and corresponding distances on the road (measured in Euclidean world units): Focal length (f), tilt angle ($\phi$), pan angle ($\theta$), and height of the camera measured from the road surface (h).

FIG. 12 presents an overview of the system and method according to this exemplary embodiment. The bulk of the processing is performed by a boosted cascade vehicle detector (BCVD), which is used to detect and track vehicles. The resulting vehicle tracks are then used to estimate the first vanishing point in the direction of travel, while strong gradients near vehicle windshields (in daytime) or the lines joining the two headlights (at night) are used to compute the second vanishing point in the direction perpendicular to the direction of travel. The Random Sample Consensus (RANSAC) procedure, disclosed in Fischler (Martin A. Fischler and Robert C. Bolles, "Random sample consensus: a paradigm for model fitting applications to image analysis and automated cartography," *Communications of the ACM*, Vol. 24(6), pages 381-395, 1981), incorporated herein by reference, is used to eliminate outliers resulting from noise and/or image compression artifacts. From the vanishing points, the camera is calibrated, which then enables the speed of vehicles to be computed by mapping pixel coordinates to world distances. The only parameter of the system is the mean vehicle width, which in some embodiments may be assumed to be seven feet.

One useful characteristic of this exemplary embodiment is that the system is calibrated incrementally. In other words, only two images of a single vehicle are needed in principle to calibrate the system, thus providing a nearly instantaneous solution to the problem. This unique behavior eliminates the delay in background subtraction techniques, which makes the system amenable for use by PTZ cameras (pan-tilt-zoom) whose parameters are continually changing. Although the first vehicle is used to obtain initial calibration parameters, those parameters are refined over time as more vehicles are detected and tracked in order to obtain more accurate estimates. Additional advantages of the approach include its immunity to shadows (Note that Dailey et al. observed more than 10% error in mean speed estimates due to shadows), as well as its insensitivity to spillover and/or dense traffic, since vehicles are detected using a discriminative set of features as opposed to simple foreground blobs.

Figure 13A:
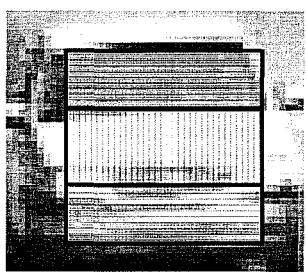
FIGS. 13*a* and 13*b* depicts an exemplary cascade of simple features performed by a Boosted Cascade Vehicle Detector.
Figure 13B:
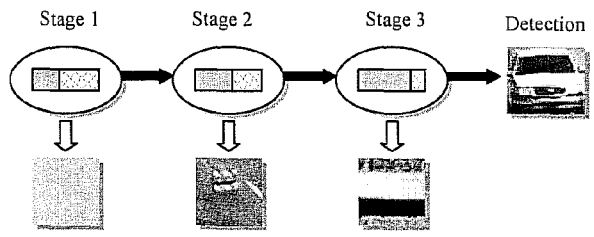

As shown in FIG. 12, a BCVD 82 is used to identify vehicles using one or more features recognized by pattern matching. The problem of pattern classification has been studied extensively for many years, giving rise to a variety of approaches such as neural networks, support vector machines (SVMs), and Bayesian classifiers. One approach of using a cascade of simple features to detect patterns in images was recently disclosed in Viola and Jones (Viola P. and Jones M., Rapid object detections using a boosted cascade of simple features, *Proceedings of the IEEE Conference on Computer Vision and Patter Recognition (CVPR)*, Vol. 1, pages 511-518, 2001), which is incorporated herein by reference. This approach is illustrated in FIGS. 13a and 13b. Each image sub-window is passed through a series of tests of increasing difficulty, known as a cascade. The goal of each stage in the cascade is to evaluate the sub-window using a set of image features to decide whether to reject the sub-window as containing the object of interest. Subsequent stages perform more detailed analyses using larger and more discriminating sets of features, with each stage trained to achieve a high hit rate (e.g., 99%) and a liberal false alarm rate (e.g., 50%). Sub-windows in the image which are easily distinguishable as non-vehicles (e.g., an image patch with little or no texture) are discarded in the initial stages of the cascade, resulting in faster processing, so that the complete set of features needs to be evaluated for only the small fraction of sub-windows that reach the final stage of the cascade. The training process ensures that the classification errors in each stage are independent of each other.

The Viola and Jones approach achieves real-time processing not only with the cascade architecture, but also because it uses simple image difference features that are quickly computed using an integral image. The features used in Viola and Jones are simply arithmetic additions and subtractions of pixel intensities in a detection window. An example of such a feature is shown in FIG. 13a where the value of a feature is computed by subtracting the sum of pixel intensities in the top and the bottom regions (horizontal bars) from the sum of pixel intensities in the middle region (vertical bars). Given a set of labeled training images (vehicles and non-vehicles), the training process first finds a feature (from a large pool of rectangular features) and a corresponding threshold on the value of the feature that performs best on the training data. A single feature in essence acts as a weak classifier whose decision is at least slightly better than random chance. The idea behind boosting is to combine several such weak classifiers in a way such that the final strong classifier meets the performance requirements. After training, vehicles are detected by sliding the strong classifier over the input image and computing the decision (vehicle or non-vehicle) at each sub-window in the image. To detect vehicles at different scales, the feature set (and in effect the detection window) is scaled (rather than the more traditional approach of resampling of the input image), which further reduces the computational load.

In the system and method of this exemplary embodiment, each input frame 80 of the video sequence is scanned exhaustively at multiple scales by the BCVD 82 to detect vehicles. An entire input frame 80 can be scanned in a fraction of a second using a standard computer. The output of the BCVD 82 is a rectangle for each detected vehicle, and the midpoint along the bottom edge of the rectangle is retained as the location of the vehicle for the purpose of computing proximity to other vehicles. Vehicles from the previous image frame are tracked using the tracking procedure shown in 84 by searching among nearby detections in the current image frame. In case a match is not found, the vehicle is flagged as missing and its location is updated by means of a standard template matching mechanism using normalized cross-correlation. If a vehicle is missing for several consecutive frames, it is discarded for the lack of sufficient evidence. Meanwhile, new vehicles are initialized for all the detections that did not yield a match. This straightforward tracking procedure 84 augments the position information of the vehicles with their image trajectories.

Lines which are parallel to each other in real world generally do not appear parallel in the image (except when they are parallel to the image plane). As an example, consider an aerial photograph of railroad tracks with the camera looking straight down. The tracks will appear parallel to each other in the image. If another image is taken standing in the middle of the tracks and pointing the camera straight ahead (camera looking towards horizon), the tracks will appear to meet at a finite point in the image plane. This point of intersection is called a vanishing point. A vanishing point is defined only by the direction of lines, in other words, all parallel lines in a particular direction will appear to converge at a single unique location in the image.

As shown in FIG. 14*a*, the first vanishing point $p_1=(u_1, v_1)$ in the direction of travel is estimated (Block 86 of FIG. 12) using vehicle tracks. A line is fitted passing through bottom-left and bottom-right image coordinates of all the detection windows for a vehicle. Estimating the vanishing point directly from the vehicle tracks avoids using the computationally expensive Hough transform disclosed in Kang et al. (Chee-Woo Kang, Rae-Hong Park and Kwae-Hi Lee, Extraction of straight line segments using rotation transformation: generalized Hough transformation, *Pattern Recognition*, Vol. 24 (7), pages 633-641, 1991). FIG. 14*a* also illustrates a scenario where a vehicle changing lanes (represented by darker rectangle) results in an outlier. In addition, tracking and localization errors can lead to outliers. RANSAC (Block 92 of FIG. 12) is used for removing the bias in the estimation of vanishing points resulting from outliers.

To estimate the vanishing point $p_2=(u_2, v_2)$ in the direction perpendicular to traffic-flow, strong image gradients (block 88 of FIG. 12) found on light colored vehicles are employed. Apparent slope of a line in an image (corresponding to a line in real world along the direction perpendicular to traffic-flow) is inversely proportional to its distance from the camera. Estimating $p_2$ as the intersection of two lines in its direction is very sensitive to measurement errors. With the assumption that the camera has zero roll, the intersection of $v=v_1$ and a line corresponding to the perpendicular direction can be found. The detection window that is closest to the camera (close to the bottom edge of an image) is used to search for a hinge point, which is a point of maximum gradient magnitude and lies along the vertical axis passing through the center of the window (along the dashed line). Next, a search is performed for a line passing through the hinge point and having a slope that maximizes the sum of gradients along that line. In FIG. 14*b*, the white circle indicates the location of the hinge point. Among the three example candidates, the line that coincides with the edge of the windshield of the vehicle (shown as a solid line) is used to compute $p_2$. In case of absence of any ambient light, headlights are used to estimate $p_2$. The hinge point is found along a vertical axis shifted to the left by a quarter of detection window width as shown in FIG. 14*c*. Note that raw pixel intensities are used in this case as opposed to gradient magnitude image used earlier.

The system and method of this exemplary embodiment is automatically calibrated using the two estimated vanishing points as shown in Block 94 of FIG. 12. Location of a vanishing point in an image is independent of the camera placement and depends only on the intrinsic camera parameters and its orientation as taught in Hartley et al., (Hartley, R. I. and Zisserman, A., "Multiple View Geometry in Computer Vision" (second edition), 2004, Cambridge University Press, ISBN: 0521540518), incorporated herein by reference. In this exemplary embodiment, vanishing points are independent of the camera height h and depend on focal length f, tilt angle $\phi$ and pan angle $\theta$. Once the two vanishing points $p_1=(u_1, v_1)$ and $p_2=(u_2, v_2)$ have been estimated, with $v_1=v_2$, the parameters f, $\phi$ and $\theta$ can be computed as follows:

$$f = \sqrt{-(v_1^2 + u_1 u_2)}$$

$$\phi = \tan^{-1}\left(\frac{-v_1}{f}\right)$$

$$\theta = \tan^{-1}\left(\frac{-u_1 \cos\phi}{f}\right)$$

Figure 15:
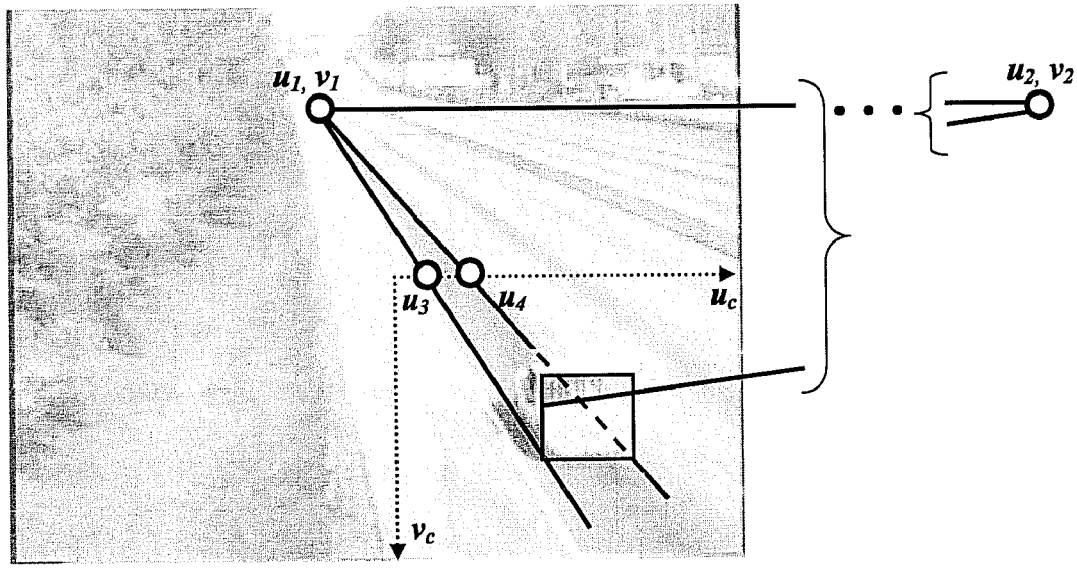
FIG. 15 depicts how exemplary calibration parameters are computed using two estimated vanishing points.

To compute the height h of the camera, one may locate two points along the horizontal axis in the image. As shown in FIG. 15, $u_3$ and $u_4$ are u-axis intercepts of lines connecting $p_1$ with the bottom-left and bottom-right points of the detection window respectively. Finally, the height may be computed using an assumed average width of a car as taught by the New Jersey Department of Transportation Roadway Design Manual (http://www.state.nj.us/transportation/eng/documents/RDME/sect2E2001.shtm) as follows:

$$h = \frac{wf\sin\phi}{(u_4 - u_3)\cos\theta}$$

The height may also be calculated using the length (l) between two points $(-, y_f, 0)$ which projects onto the image at $(-, v_f)$ and $(-, yb, 0)$ which projects onto the image at $(-, v_b)$ of a line segment parallel to the road as follows:

$$h = \frac{f\kappa l \cos\theta}{f^2 + v_0^2}$$

where $\kappa=(v_f-v_0)(v_b-v_0)/(v_f-v_b)$. The (−) symbol indicates the value is irrelevant to the calculation.

Once the camera has been calibrated, the pixel location of a vehicle in the image (u, v) can be mapped into a location on the road (x, y) using following equations:

$$x = \frac{uh}{v\cos\phi + f\sin\phi}$$

$$y = \frac{h(f - v\tan\phi)}{v + f\tan\phi}$$

The distance traveled by a vehicle between two arbitrary image frames can be easily computed using the above relations. The speed of a vehicle is computed and output by the system and method (block 96 of FIG. 12) using the distance traveled, the corresponding number of frames, and the frame rate (FPS) of the camera.

Example

The Intel OpenCV library was used to train two vehicle detectors (BCVDs), one for daytime and one for night, using two separate training sequences. At run time, the system automatically selects the proper detector (day or night) based on the average pixel intensity in the images. To test the system, four image sequences were captured (three during daylight conditions and one at night) using an inexpensive off-the-shelf web camera (Logitech Orbitz) mounted at the top of an adjustable pole. The images were captured at 15 frames per second at 320×240 pixel resolution. Note that different cameras were used for capturing the training and test sequences, and that the cameras were not placed in the same location, thus demonstrating the robustness of the system.

Figure 16:
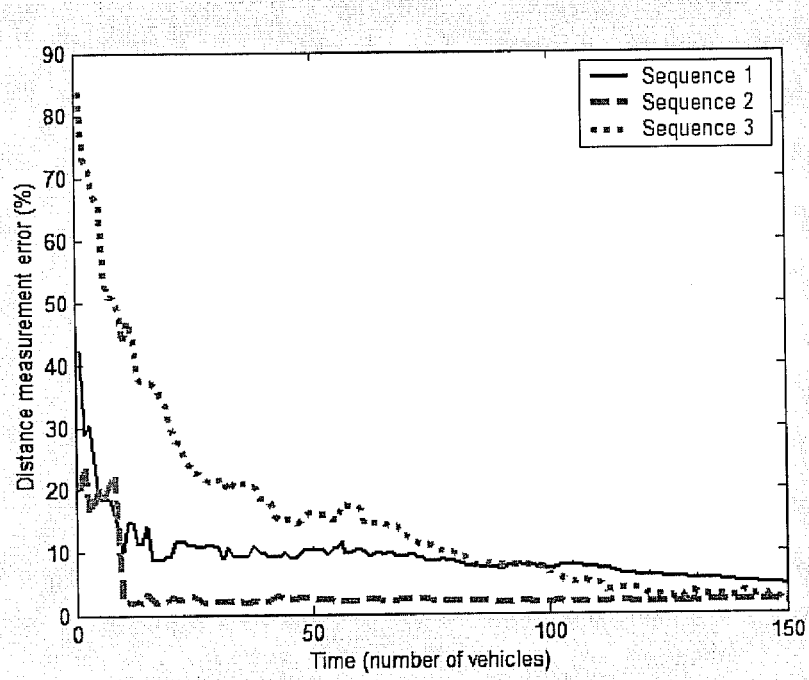
FIG. 16 depicts error in measuring known distances as a function of time.

The sequences were approximately 10 minutes long each. A radar was used to compare the mean speed over the entire sequence for three of the sequences, with the results displayed in the table below. Treating the radar as ground truth, the error of the system ranged from 3 to 6 mph, with a slightly greater standard deviation than the radar. FIG. 16 shows the error in the distance estimate (displayed as a percentage) versus the amount of data that the procedure was allowed to use. As mentioned previously, the system and method of this exemplary embodiment instantaneously yields initial estimate, which improves over time as more information is gathered. In two of the sequences the estimate stabilized after only ten vehicles, while the poor weather conditions of the third sequence caused the estimate to require more data.

Table 3 shows the accuracy of the estimation of the camera parameters for the four sequences. The accuracy was computed by comparing with camera parameters obtained using the same equations but with hand-labeled vanishing points. In all cases the error is less than 10%. Table 4 displays the speed error for twenty individual vehicles in each of the four sequences. The average error ranges from 3 to 5 mph.

Table 3 is provided below. f is the focal length, $\phi$ is the tilt angle, $\theta$ is the pan angle, h is the camera height. $\mu$, $\sigma$ and N are mean speed for the entire sequence, standard deviation of speeds and number of observations used for computation.

TABLE 3

| | Sequence 1 | | Sequence 2 | | Sequence 3 | | Sequence 4 | |
|---|---|---|---|---|---|---|---|---|
| | Manual | Algorithm | Manual | Algorithm | Manual | Algorithm | Manual | Algorithm |
| f (pixels) | 376.21 | 366.83 | 389.43 | 382.26 | 387.04 | 411.06 | 382.76 | 380.16 |
| φ (degrees) | 7.12° | 7.44° | 15.21° | 14.89° | 12.82° | 11.53° | 23.14° | 23.77° |
| θ (degrees) | 14.97° | 16.76° | 19.76° | 20.05° | 24.27° | 22.34° | 7.83° | 8.25° |
| h (feet) | 15 | 14.2 | 30 | 29.69 | 30 | 28.83 | 20 | 18.62 |

| | Sequence 1 | | Sequence 2 | | Sequence 3 | |
|---|---|---|---|---|---|---|
| | Radar | Algorithm | Radar | Algorithm | Radar | Algorithm |
| μ | 61.81 | 63.92 | 62.22 | 61.62 | 54.3 | 51.66 |
| σ | 4.42 | 5.97 | 3.77 | 4.78 | 3.7 | 5.12 |
| N | 187 | 520 | 235 | 491 | 196 | 416 |

Table 4 is provided below. Ground-truth speeds were measured manually by observing the video with the help of markers placed in the scene. Vehicles were chosen at random to compare accuracy of speed estimation.

TABLE 4

| Vehicle Number | Lane | Measured Speed | Algorithm Speed | Vehicle Number | Lane | Measured Speed | Algorithm Speed |
|---|---|---|---|---|---|---|---|
| Sequence 1 | | | | Sequence 2 | | | |
| 145 | 2 | 57 | 53 | 30 | 3 | 64 | 63 |
| 185 | 2 | 57 | 55 | 84 | 2 | 61 | 58 |
| 191 | 2 | 51 | 53 | 133 | 1 | 59 | 56 |
| 254 | 2 | 64 | 63 | 135 | 1 | 59 | 57 |
| 276 | 2 | 64 | 63 | 246 | 2 | 57 | 57 |
| 314 | 1 | 64 | 67 | 272 | 3 | 64 | 64 |
| 326 | 2 | 57 | 55 | 276 | 2 | 64 | 63 |
| 339 | 2 | 51 | 62 | 318 | 3 | 49 | 62 |
| 356 | 1 | 64 | 63 | 374 | 3 | 67 | 65 |
| 357 | 2 | 57 | 61 | 375 | 2 | 55 | 50 |
| 386 | 1 | 64 | 63 | 379 | 2 | 55 | 56 |
| 402 | 2 | 51 | 50 | 399 | 2 | 61 | 62 |
| 407 | 1 | 57 | 54 | 419 | 1 | 59 | 57 |
| 442 | 2 | 51 | 56 | 431 | 4 | 67 | 64 |
| 447 | 1 | 64 | 73 | 458 | 3 | 64 | 62 |
| 472 | 2 | 57 | 56 | 464 | 2 | 57 | 56 |
| 504 | 1 | 64 | 65 | 524 | 3 | 59 | 59 |
| 505 | 2 | 73 | 61 | 543 | 2 | 67 | 65 |
| 507 | 1 | 64 | 61 | 601 | 4 | 61 | 62 |
| 513 | 2 | 64 | 65 | 608 | 2 | 64 | 62 |

TABLE 4-continued

| Vehicle Number | Lane | Measured Speed | Algorithm Speed | Vehicle Number | Lane | Measured Speed | Algorithm Speed |
|---|---|---|---|---|---|---|---|
| Mean error (mph) Sequence 3 | | | 3.5 | Mean error (mph) Sequence 4 | | | 2.25 |
| 129 | 1 | 59 | 54 | 1 | 2 | 45 | 48 |
| 130 | 3 | 55 | 55 | 5 | 2 | 55 | 53 |
| 154 | 2 | 57 | 52 | 8 | 2 | 46 | 42 |
| 164 | 3 | 57 | 53 | 17 | 1 | 57 | 59 |
| 176 | 3 | 59 | 54 | 21 | 2 | 45 | 43 |
| 193 | 2 | 55 | 50 | 25 | 1 | 46 | 48 |
| 202 | 1 | 64 | 57 | 34 | 1 | 59 | 59 |
| 205 | 3 | 59 | 60 | 37 | 1 | 55 | 51 |
| 213 | 2 | 59 | 54 | 39 | 1 | 48 | 43 |
| 239 | 2 | 57 | 53 | 42 | 1 | 53 | 50 |
| 289 | 2 | 57 | 51 | 46 | 1 | 46 | 43 |
| 354 | 4 | 61 | 57 | 52 | 1 | 57 | 52 |
| 373 | 2 | 57 | 50 | 55 | 1 | 53 | 52 |
| 406 | 2 | 51 | 47 | 59 | 2 | 53 | 49 |
| 427 | 3 | 53 | 45 | 61 | 1 | 43 | 43 |
| 444 | 1 | 57 | 50 | 62 | 2 | 57 | 51 |
| 471 | 3 | 55 | 49 | 64 | 2 | 53 | 56 |
| 510 | 2 | 46 | 40 | 66 | 1 | 57 | 54 |
| 551 | 2 | 53 | 49 | 71 | 2 | 57 | 54 |
| 574 | 3 | 55 | 49 | 72 | 1 | 45 | 44 |
| Mean error (mph) | | | 4.95 | Mean error (mph) | | | 2.8 |

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for detecting and tracking one or more vehicles using a system for obtaining two-dimensional visual data depicting traffic flow on a road, the two-dimensional visual data comprising a plurality of image frames, the method comprising:
   filtering the two-dimensional visual data using background subtraction to yield a foreground mask;
   identifying a plurality of feature points from the foreground mask using a feature detector;
   determining the plumb line projection of the feature points;
   estimating three-dimensional world coordinates of the feature points using the plumb line projection of the feature points;
   categorizing each of the feature points as either a stable feature or an unstable feature based on the estimated three-dimensional world coordinates of the feature points;
   grouping stable features to form groups of associated stable features;
   associating unstable features with groups of associated stable features to create segmented feature groups;
   outputting data based on the segmented feature groups.

2. The method of claim 1, wherein the method further comprises classifying a segmented feature group as either a car or a truck based on the number of unstable features associated with the segmented feature group.

3. The method of claim 1, wherein the method comprises tracking segmented feature groups over the plurality image frames.

4. The method of claim 3, wherein the method comprises associating a segmented feature group already being tracked with a segmented feature group in a current image frame by computing the number of stable features shared between the segmented feature group already being tracked and the segmented feature group in the current image frame.

5. The method of claim 4, wherein the method further comprises initializing a segmented feature group in a current image frame that has not been associated with a segmented feature group already being tracked as a new vehicle.

6. The method of claim 1, wherein the method comprises calibrating the system for obtaining two-dimensional visual data.

7. The method of claim 1, wherein the system for obtaining two-dimensional visual data is calibrated using an automatic calibration procedure.

8. The method of claim 1, wherein the system for obtaining two-dimensional visual data comprises a camera that is mounted at a low angle and off-centered with respect to the road.

9. A method for detecting and tracking one or more vehicles using a system for obtaining two-dimensional visual data depicting traffic flow on a road, the two-dimensional visual data comprising a plurality of image frames, the method comprising:
   calibrating the system for obtaining two-dimensional visual data;
   filtering the two-dimensional visual data using background subtraction to yield a foreground mask;
   detecting a vehicle base front from the foreground mask, the vehicle base front representative of the front side of a base of a vehicle;
   tracking the vehicle base front through the plurality of image frames; and
   outputting data based on the tracking of the vehicle base front.

10. The method of claim 9, wherein the system for obtaining two-dimensional visual data is calibrated using an automatic calibration procedure.

11. The method of claim 9, wherein the method further tracking the vehicle base front through the plurality of image frames comprises:

detecting features in a base-constrained region associated with the vehicle base front; and estimating displacement of a vehicle base front using the detected features in the base-constrained region associated with the vehicle base front.

12. The method of claim 9, wherein the method further comprises filtering shadows from the two-dimensional visual data.

13. The method of claim 9, wherein the system for obtaining two-dimensional visual data comprises a camera that is mounted at a low angle and off-centered with respect to the road.

14. The computer-implemented method of claim 9, wherein the method comprises detecting a vehicle base front from the foreground mask using a difference operator in the vertical direction.

15. A computer-implemented method for automatically calibrating a system for detecting and tracking one or more vehicles based on two-dimensional visual data depicting traffic flow, the two-dimensional visual data comprising a plurality of image frames, the two-dimensional visual data defining a direction of travel and a direction perpendicular to the direction of travel, the computer-implemented method comprising:

detecting and tracking, with a computing device, a vehicle based on the two-dimensional visual data to determine vehicle tracks of the vehicle;

estimating, with the computing device, a first vanishing point in the direction of travel using the vehicle tracks of the detected vehicle;

estimating, with the computing device, a second vanishing point in the direction perpendicular to the direction of travel using strong image gradients found on the detected vehicle; and calibrating the system for detecting and tracking one or more vehicles based on two-dimensional visual data using the first and second vanishing points.

16. The computer-implemented method of claim 15, wherein a vehicle is detected using a boosted cascade vehicle detector.

17. The computer-implemented method of claim 16, wherein the boosted cascade vehicle detector performs a pattern classification procedure.

18. The computer-implemented method of claim 15, wherein the method comprises using a Random Sample Consensus (RANSAC) procedure to eliminate outliers resulting from noise and/or image compression.

19. The computer-implemented method of claim 15, wherein a hinge point is used to estimate the second vanishing point.

20. The computer-implemented method of claim 15, wherein the system for detecting and tracking one or more vehicles comprises a pan-tilt-zoom camera, the method comprising determining the focal length, tilt angle, pan angle, or height of the pan-tilt-zoom camera using the first and second vanishing points.

* * * * *

UNITED STATES PATENT AND TRADEMARK OFFICE
CERTIFICATE OF CORRECTION

PATENT NO.        : 8,379,926 B2                                          Page 1 of 1
APPLICATION NO.   : 12/747260
DATED             : February 19, 2013
INVENTOR(S)       : Kanhere et al.

It is certified that error appears in the above-identified patent and that said Letters Patent is hereby corrected as shown below:

In the Claims

Column 30, lines 65-66, claim 11 "wherein the method further tracking" should read
--wherein the tracking--

Signed and Sealed this
Twelfth Day of August, 2014

Michelle K. Lee
*Deputy Director of the United States Patent and Trademark Office*